US012212280B2

(12) United States Patent
Eglsaer et al.

(10) Patent No.: US 12,212,280 B2
(45) Date of Patent: Jan. 28, 2025

(54) MULTIFUNCTION SPACER-WIRE CLIPS FOR SOLAR PANELS AND RELATED METHODS

(71) Applicant: Freedom Forever LLC, Temecula, CA (US)

(72) Inventors: Brian Joseph Eglsaer, San Mateo, CA (US); Matthew Thomas Markham, Charleston, SC (US); Ryan Tucker Silvernale, Chatham, NY (US)

(73) Assignee: Freedom Forever LLC, Temecula, CA (US)

( * ) Notice: Subject to any disclaimer, the term of this patent is extended or adjusted under 35 U.S.C. 154(b) by 0 days.

(21) Appl. No.: 18/447,426

(22) Filed: Aug. 10, 2023

(65) Prior Publication Data

US 2024/0056025 A1    Feb. 15, 2024

Related U.S. Application Data

(60) Provisional application No. 63/370,981, filed on Aug. 10, 2022.

(51) Int. Cl.
*H02S 40/34* (2014.01)

(52) U.S. Cl.
CPC .................................. *H02S 40/34* (2014.12)

(58) Field of Classification Search
CPC .......... H02S 40/34; H02S 20/23; H02S 40/30; H02S 40/00; Y10T 24/44
See application file for complete search history.

(56) References Cited

U.S. PATENT DOCUMENTS

| | | | | |
|---|---|---|---|---|
| 8,806,813 B2* | 8/2014 | Plaisted | ................. | H02S 20/23 52/173.3 |
| 9,166,524 B2* | 10/2015 | West | ..................... | F24S 25/613 |
| 9,551,510 B2* | 1/2017 | Hartelius | .............. | F24S 25/634 |
| 9,647,433 B2* | 5/2017 | Meine | ................... | F24S 25/634 |
| 9,893,677 B1* | 2/2018 | Liu | .......................... | H02S 20/23 |
| 9,911,880 B2* | 3/2018 | West | ..................... | H02S 20/23 |
| 2014/0326838 A1* | 11/2014 | West | ...................... | F24S 25/61 248/74.2 |
| 2016/0268965 A1* | 9/2016 | Stearns | .................. | H02S 40/32 |
| 2016/0359451 A1* | 12/2016 | Mao | ........................ | H02S 20/23 |
| 2017/0346439 A1* | 11/2017 | Pereira | .................... | H02G 3/00 |
| 2021/0057590 A1* | 2/2021 | Mao | ........................ | H02S 40/34 |
| 2024/0056025 A1* | 2/2024 | Eglsaer | .................. | H02S 40/34 |

* cited by examiner

*Primary Examiner* — Robert Sandy
*Assistant Examiner* — Louis A Mercado
(74) *Attorney, Agent, or Firm* — PCFB, LLC; Justin K. Flanagan

(57) ABSTRACT

Multifunction spacer-wire clips provide spacing and protection during the shipping of solar panels. A multifunction spacer-wire clip can be subsequently used for wire management during installation and solar panel operation. One example of a spacer-wire clip includes a flange overhang portion, a main body portion. a frame arm portion, and a wire retainer extending from the main body portion sized and configured to selectively retain at least one wire within at least one wire cavity.

14 Claims, 17 Drawing Sheets

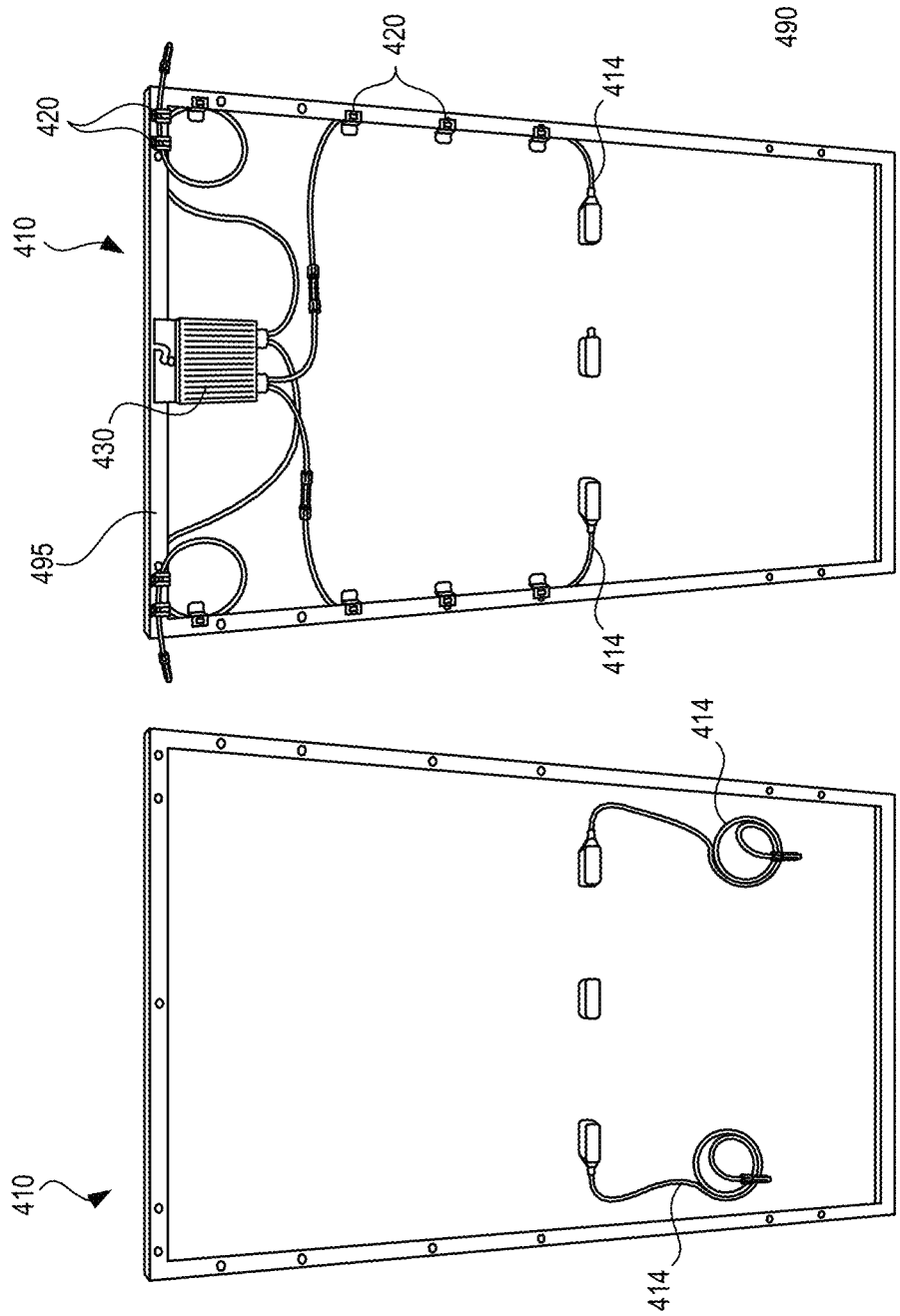

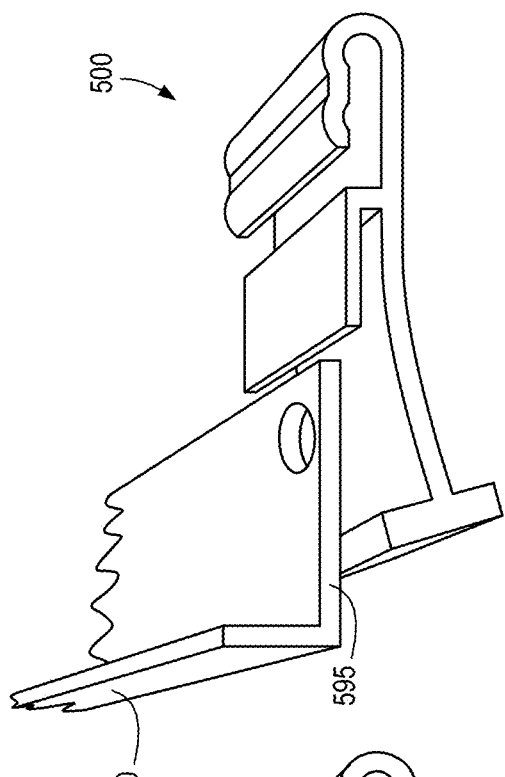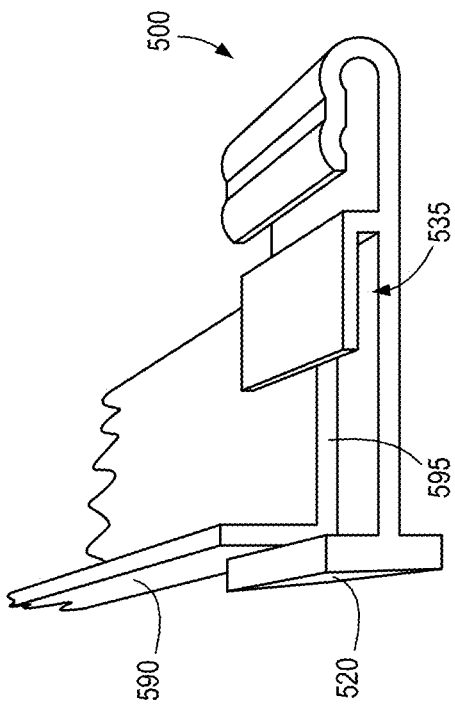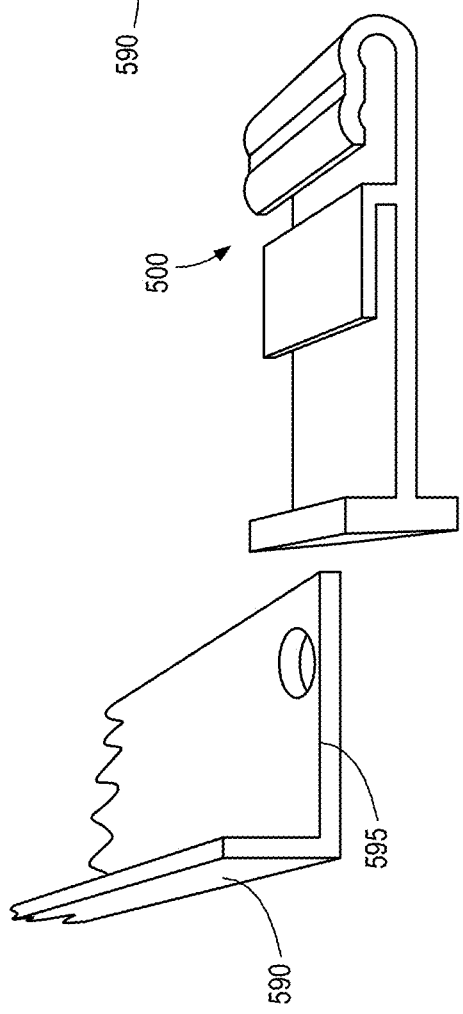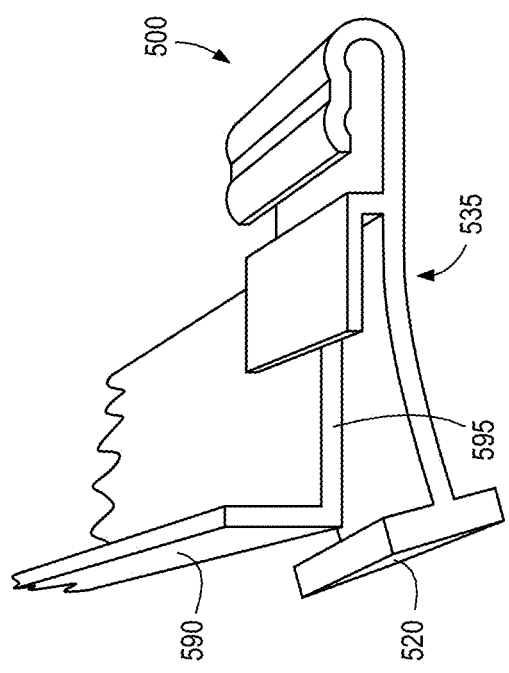

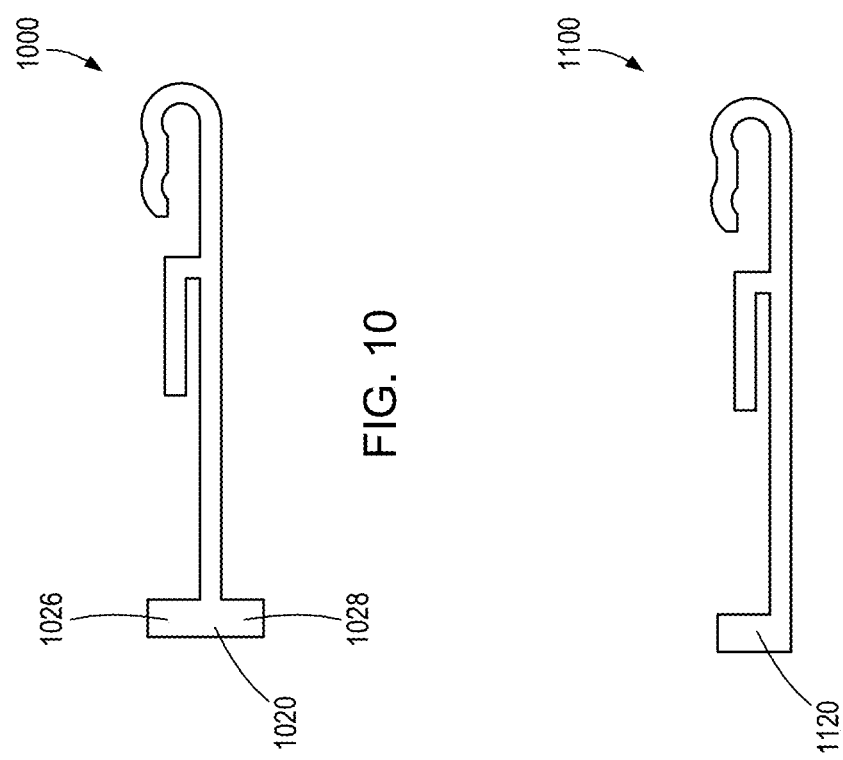

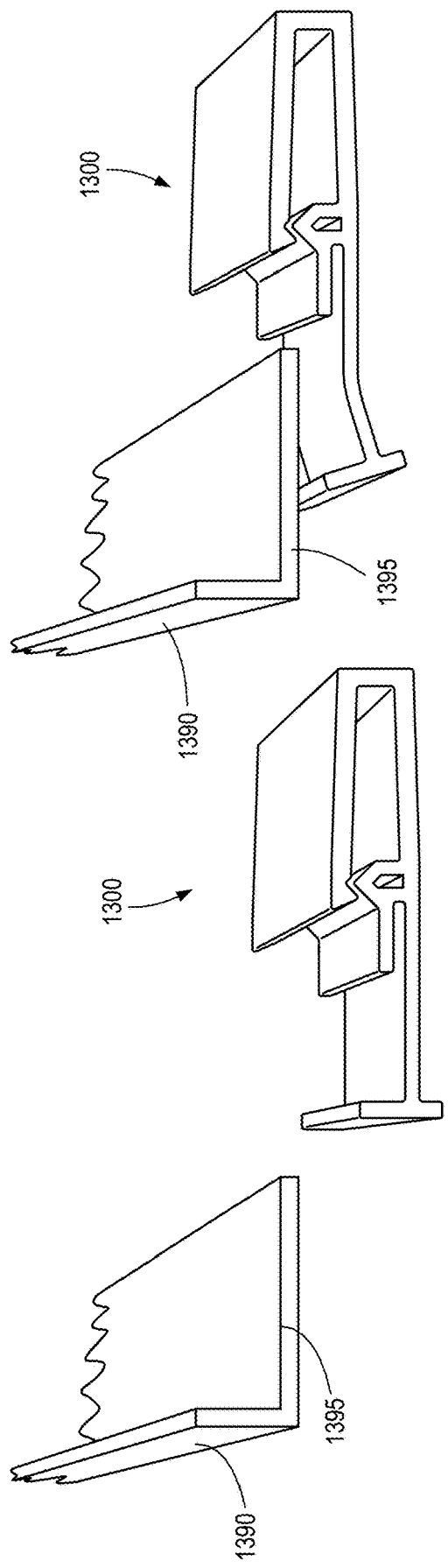
FIG.13F
FIG.13G
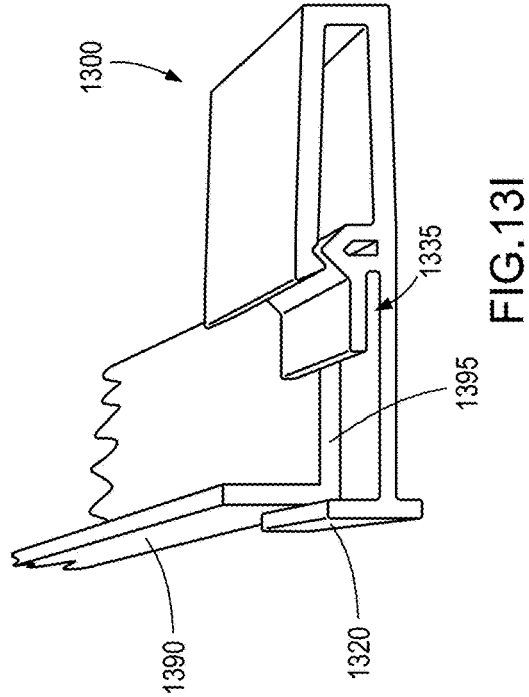
FIG.13H
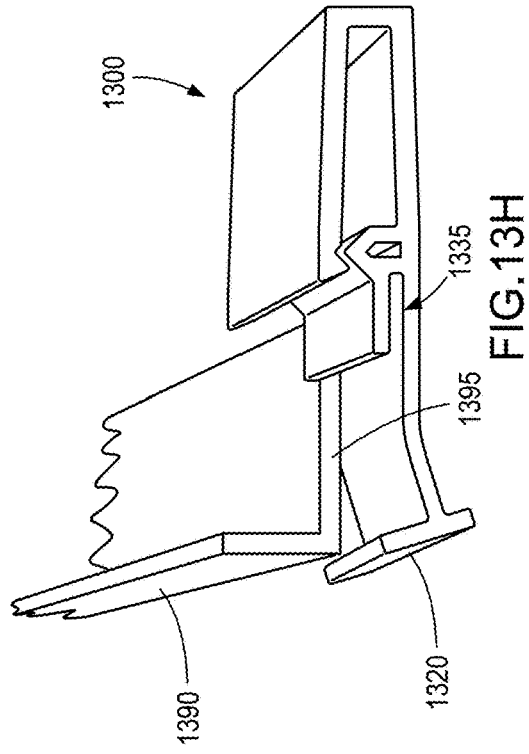
FIG.13I

MULTIFUNCTION SPACER-WIRE CLIPS FOR SOLAR PANELS AND RELATED METHODS

RELATED APPLICATIONS

This application claims priority to and benefit under 35 U.S.C. § 119 to U.S. Provisional Patent Application No. 63/370,981 filed on Aug. 10, 2022, titled "MULTIFUNCTION WIRE SPACER CLIPS FOR SOLAR PANELS," which is hereby incorporated by reference in its entirety.

TECHNICAL FIELD

This disclosure relates to solar panels. More particularly, this disclosure relates to protecting solar panels during shipping and managing wires.

BRIEF DESCRIPTION OF THE DRAWINGS

Non-limiting and non-exhaustive embodiments of the disclosure are described, including various embodiments of the disclosure with reference to the figures, in which:

FIG. 4A illustrates the positive and negative wires of a solar panel coiled and taped to the back of the solar panel for shipping, according to one embodiment.

FIG. 4B illustrates wire clips added to the sides of the solar panel for connection to a panel-mounted microinverter or power optimizer prior to installation, according to one embodiment.

FIG. 4C illustrates a cross-sectional view of a portion of the frame and flange of the solar panels illustrated in FIGS. 4A and 4B, according to one embodiment.

FIG. 5E illustrates a perspective view of the multifunction spacer-wire clip of FIG. 5A next to a flange of a solar panel.

FIG. 5F illustrates another perspective view of the multifunction spacer-wire clip of FIG. 5A flexing for placement on the flange of the solar panel.

FIG. 5G illustrates another perspective view of the multifunction spacer-wire clip of FIG. 5A being placed on the flange of the solar panel.

FIG. 5H illustrates another perspective view of the multifunction spacer-wire clip of FIG. 5A secured to the flange of the solar panel.

FIG. 10 illustrates an embodiment of a multifunction spacer-wire clip with a dual-direction frame arm with an alignment protrusion, according to one embodiment.

FIG. 11 illustrates an embodiment of a multifunction spacer-wire clip with a single-direction frame arm without an alignment protrusion, according to one embodiment.

FIG. 13F illustrates a perspective view of the multifunction spacer-wire clip of FIG. 13A next to a flange of a solar panel according to one embodiment.

FIG. 13G illustrates another perspective view of the multifunction spacer-wire clip of FIG. 13A flexing for placement on the flange of the solar panel according to one embodiment.

FIG. 13H illustrates another perspective view of the multifunction spacer-wire clip of FIG. 13A being placed on the flange of the solar panel according to one embodiment.

FIG. 13I illustrates another perspective view of the multifunction spacer-wire clip of FIG. 13A secured to the flange of the solar panel according to one embodiment.

DETAILED DESCRIPTION

Figure 1:
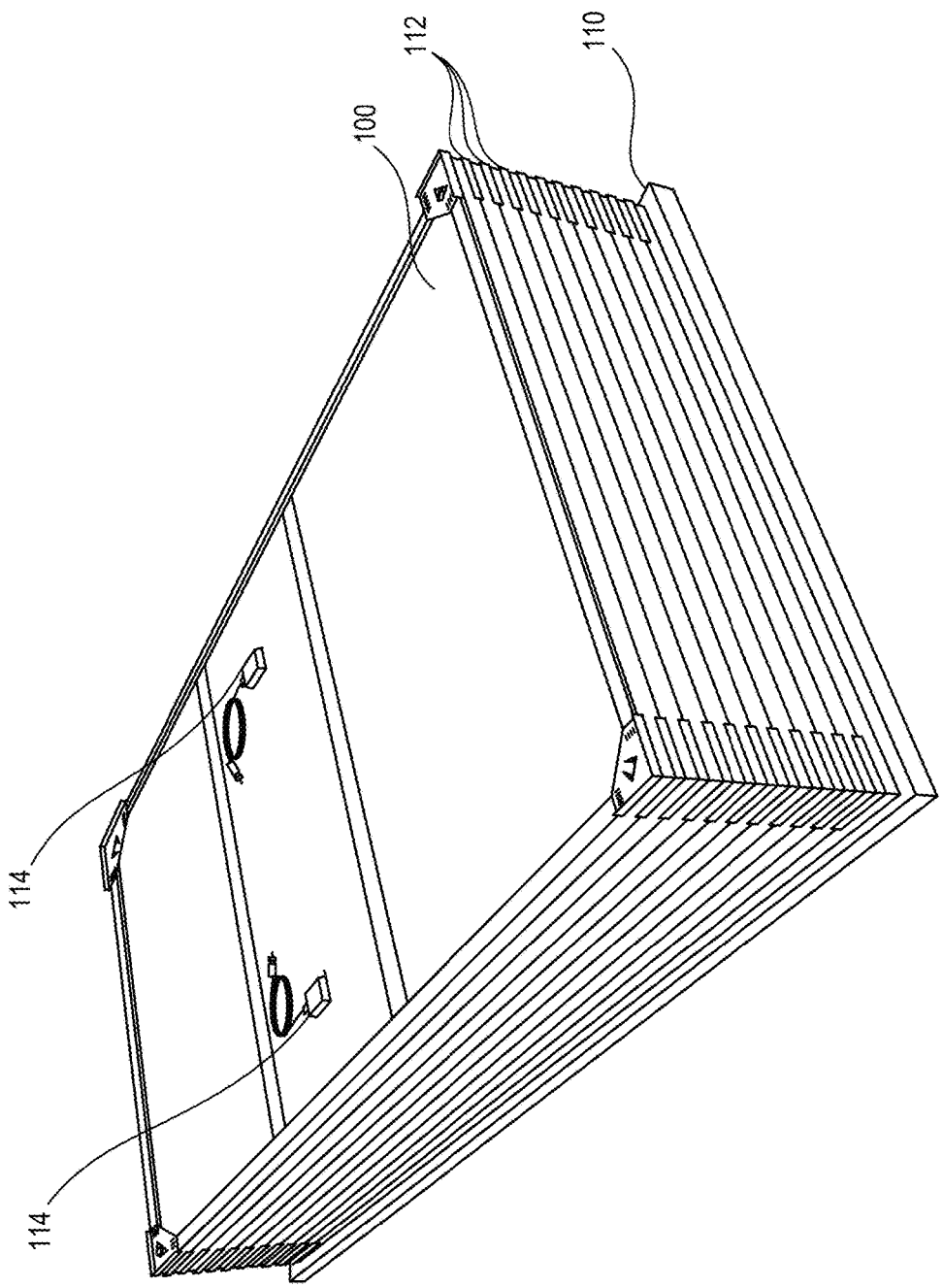
FIG. 1 is an image of a plurality of solar panels on a pallet for shipping, according to one embodiment.

Stacks of solar panels may be shipped on a pallet with spacers between individual solar panels to prevent damage. The spacers, such as side spacer clips and corner spacer clips, may be placed on each solar panel during packaging and removed and discarded prior to installation. Positive and negative wire leads are often coiled, zip-tied, and/or taped to the back of the solar panel. Other packaging materials, such as cardboard and plastic wrap, may be additionally used to protect the solar panel during shipping.

Prior to installation, the installer may remove and discard the packaging materials, including the various spacer clips. Wire management clips may then be added to the solar panel to route the wire leads prior to installation. The wire management clips may be used to, for example, maintain the wires elevated above a roof of a structure or other mounting surfaces.

This disclosure includes several embodiments and variations of multifunction solar panel spacer-wire clips. The described multifunction solar panel spacer-wire clips are multifunctional in that they may be used during shipping as spacers between stacked solar panels and remain in place (i.e., are not discarded), and may also be used for wire management during installation (e.g., to route and manage power wires, data cables, or the like). The multifunction solar panel spacer-wire clips may be referred to as dual-purpose solar panel clips, multifunction module spacer-wire clips, or all-in-one module spacer-wire clips, where the term "module" refers to an assembly (e.g., a two-dimensional array) of solar cells wired in series and/or parallel and packaged as a single panel with positive and negative wire leads that are externally accessible. The term "spacer-wire clip" is used herein for shorthand to describe many of the variously described embodiments.

As described herein, many solar panels (or "modules") include a frame around the perimeter of the array of solar cells with a flange that can be used for mounting the solar panel to the roof or other mounting surface. The embodiments of the disclosure can be understood with reference to the drawings. It will be readily understood that the components of the disclosed embodiments, as generally described and illustrated in the figures herein, could be arranged and designed in a wide variety of different configurations and dimensions. Thus, the following detailed description of the embodiments of the systems and methods of the disclosure is not intended to limit the scope of the disclosure, as claimed, but is merely representative of possible embodiments of the disclosure. In addition, the steps of a method, such as the steps for clip installation, do not necessarily need to be executed in any specific order, or even sequentially, nor do the steps need to be executed only once, unless otherwise specified.

For example, the specific dimensions of a given spacer-wire clip may be adjusted to increase the friction fit on a frame of a given solar panel. Additionally, the dimensions of a spacer-wire clip may be modified to accommodate frames having different lateral heights and/or flanges with different widths. Moreover, the thickness of a spacer-wire clip may be adjusted to increase or decrease the spacing between solar panels stacked for shipping.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

It is recognized that a wide variety of materials and manufacturing techniques may be used to fabricate the various embodiments of spacer-wire clips described herein. In some embodiments, the spacer-wire clips may be a single monolithic material. In additional embodiments, multiple materials may be utilized. For example, a first material may be used to provide sufficient rigidity and strength for the spacer-wire clip to function for wire routing and management for many years, while another material may be used as a coating, outer layer, and/or in specific contact locations to provide cushioning, impact absorption, abrasion resistance, and/or otherwise protect stacked solar panels during shipping. In some embodiments, the spacer-wire clips may be manufactured with a metal core or metal layer. In other embodiments, the spacer-wire clips are manufactured using one or more polymers, plastics, and/or rubbers.

Examples of suitable materials to fabricate the various embodiments of spacer-wire clips described herein include but are not limited to, ABS, TPE, TPU, PLA, HIPS, PETG, carbon-fiber-infused PLA or ABS, ASA, polycarbonate, polypropylene, polyethylene ether (e.g., Sabic Noryl SE1X), or the like. Various metals and metal alloys may be utilized in some embodiments. The various embodiments of spacer-wire clips may be three-dimensionally printed, thermo-formed, die cut, solvent welded, injection molded, rotationally molded, extrusion blow molded, injection blow molded, vacuum cast, and/or otherwise fabricated using fabrication techniques known to be useful for fabricating plastic, rubber, and/or metal components.

FIG. 1 is an image of a plurality of solar panels 100 on a pallet 110 for shipping, according to one embodiment. As illustrated, the solar panels 100 are spaced from one another using white spacers 112 that are used for shipping and then discarded. Negative and positive wires 114 of the solar panel 100 are coiled, bound with a zip tie, and taped to the back of the panel. Each of the solar panels 100 may be further wrapped in cardboard or plastic for additional protection. As described herein, much of the packing and shipping materials must be removed and discarded (e.g., wasted) prior to the installation of the solar panels 100.

Figure 2B:
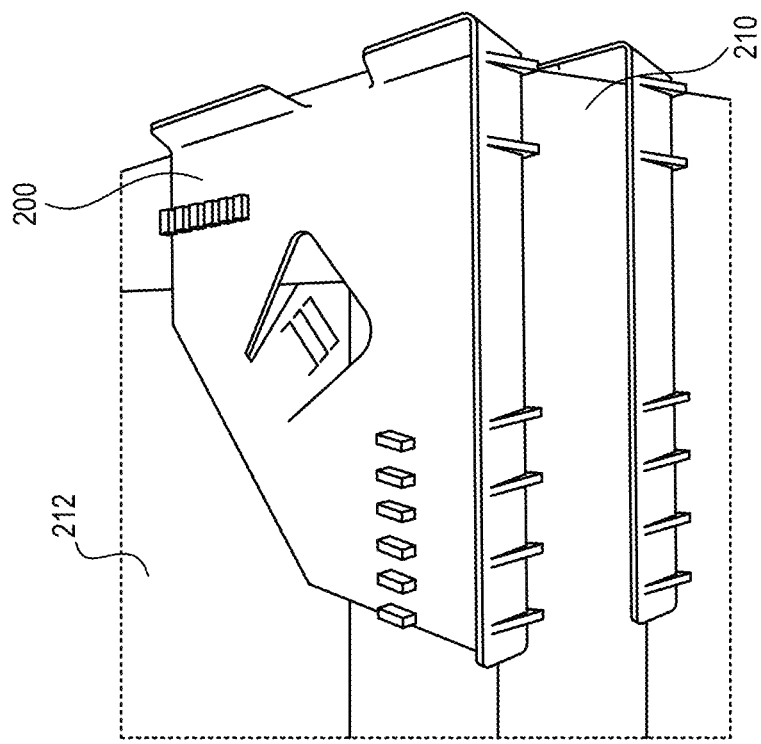
FIGS. 2A and 2B are images of disposable corner spacer clips used to protect and separate solar panels during shipping, according to one embodiment.
Figure 2A:
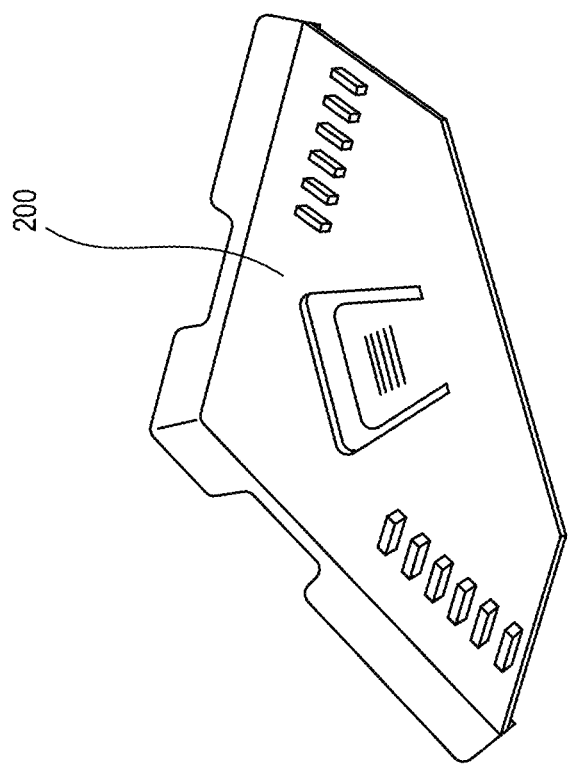

FIG. 2A is an image of an example corner spacer clip 200 that is used to space solar panels from one another during shipping. The spacer clip 200 is disposable and serves no purpose other than to protect and space the solar panels from one another during shipping. As described herein, the spacer clips 200 are removed from the solar panels and discarded prior to installation.

FIG. 2B is an image of the corner spacer clip 200 installed on a flange 210 of a solar panel 212.

Figure 3C:
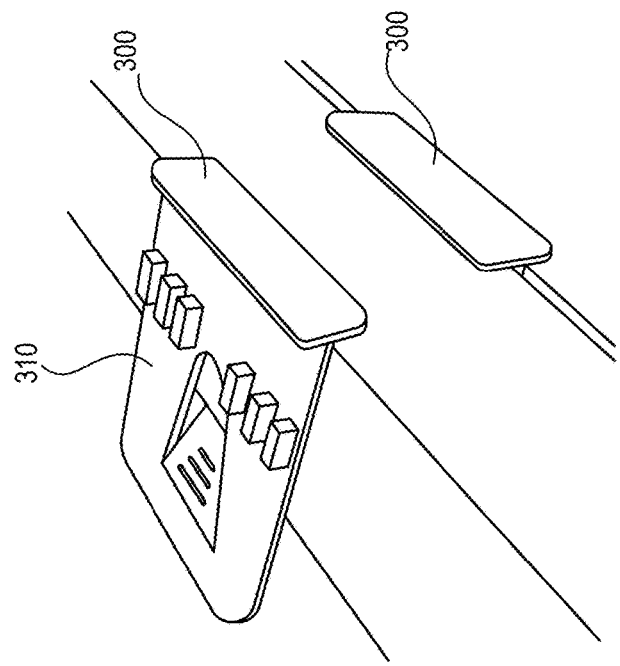
FIGS. 3A, 3B, and 3C are images of disposable side spacer clips used to protect and separate solar panels during shipping, according to one embodiment.
Figure 3B:
Figure 3D:
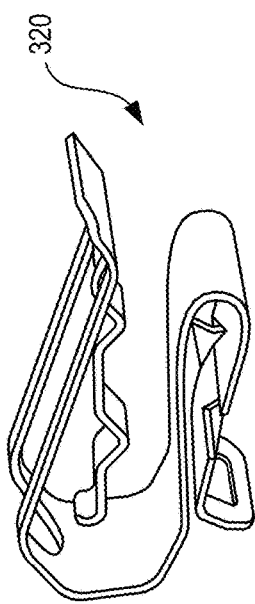
FIG. 3D illustrates an example of a metal wire clip that is installed on the solar panel after shipping and during installation for wire management, according to one embodiment.
Figure 3A:
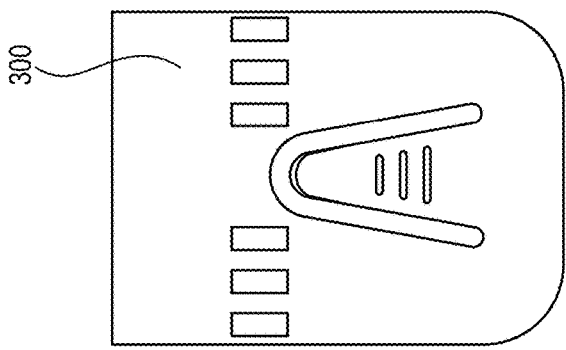

FIGS. 3A, 3B, and 3C are images of disposable side clips 300 used to protect and separate solar panels 310 during shipping, according to one embodiment. Again, the illustrated spacer clips 300 are examples of disposable spacer clips used during shipping. The illustrated spacer clips 300 are removed and discarded prior to the installation of the solar panels 310.

FIG. 3D illustrates an example of a metal wire clip 320 that is installed on the solar panel 310 after shipping during installation for wire management, according to one embodiment. As is readily apparent, the metal wire clip 320 cannot function as a spacer for impact protection during shipping. Accordingly, the metal wire clip 320 is installed after shipping (e.g., after the removal and disposal of spacer clips, such as the spacer clips 300 and/or the corner spacer clips 200 illustrated in FIGS. 2A-3C).

FIG. 4A illustrates a solar panel 410 with positive and negative wires 414 coiled and taped to the back of the solar panel 410 for shipping, according to one embodiment. The illustrated embodiment shows the disposable spacer clips removed from the solar panel 410 prior to installation. Care must be taken to ensure that the wires 414 are not damaged by the installer when trying to remove (e.g., cut) the tape and/or zip ties that secure the wires 414 during transportation and shipping.

FIG. 4B illustrates metal wire clips 420 added to the sides of the solar panel 410 for connection to a panel-mounted microinverter or power optimizer device 430 prior to installation, according to one embodiment. As illustrated, the negative and positive wires 414 are routed along a flange 495 of the solar panel 410 using metal wire clips 420 that are added to the solar panel 410 to route the wires 414 for connection to the leads on the microinverter or power optimizer device 430 that is also secured to the flange 495 of the solar panel 410. Additional metal wire clips 420 are shown added to the top corner flanges of the solar panel 410 to route the external connections of the microinverter or power optimizer device 430.

FIG. 4C illustrates a cross-sectional view of a portion of a frame 490 and flange 495 of the solar panel 410 illustrated in FIGS. 4A and 4B, according to one embodiment. As an example, the frame 490 may have a height of approximately 30 millimeters. An upper cavity 401 may secure glass, solar cells, wires, and backing of the solar panel 410 (illustrated in dashed lines). A lower cavity 405 is formed between the inner surface of the flange 495 and the backing of the solar panel 410. The external surface of the flange 495 may be mounted to the roof or other mounting surface during installation. The wire clips 420 in FIG. 4B (e.g., the metal wire clip 320 in FIG. 3D) are secured to the flange 495 during the installation of the solar panel 410, after disposable spacer clips (e.g., the spacer clips 300 and/or the corner spacer clips 200 illustrated in FIGS. 2A-3C) used for protection during shipping have been removed.

In some embodiments, metal wire clips may be added to the solar panel flanges to route the negative and positive wires of the solar panel directly for external connection without the use of the microinverter or power optimizer device.

Existing shipping and installation approaches include removing and discarding the disposable spacer clips (e.g., the spacer clips 300 and/or the corner spacer clips 200 illustrated in FIGS. 2A-3C), uncoiling and removing the zip ties from the coiled wires (see FIG. 4), adding single-purpose metal wire clips to the flanges to route the solar panel wires, and routing the solar panel wires through the newly added metal wire clips. This existing shipping and installation approach takes a significant amount of time, can easily result in damage to the wires (e.g., when cutting the zip ties binding the wires), and results in a significant amount of wasted material (e.g., the discarded spacer clips used only for shipping).

As described in greater detail below, multifunction spacer-wire clips according to embodiments of the present disclosure may be installed prior to shipping to protect the solar panels during shipping and may then be used during installation to route and manage the wires. The multifunction spacer-wire clips can additionally be used to secure the wires during shipping as well to obviate and/or reduce the need for zip ties and tape. Accordingly, the spacer-wire clips described herein may provide the same or improved shipping protection as offered by the spacer clips described above, but do not need to be removed prior to installation. In fact, they can be used to secure the wires during shipping, during installation, and for many years thereafter.

Figure 5C:
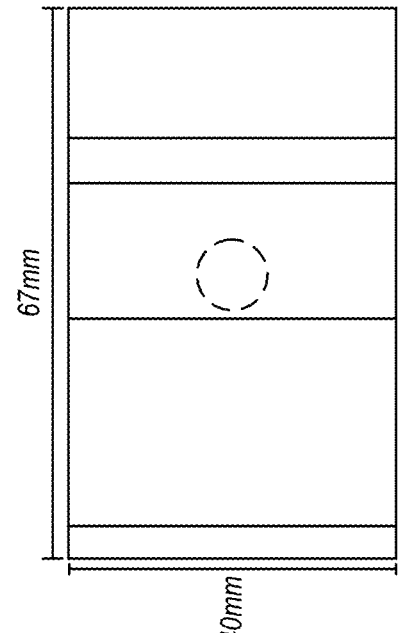
FIG. 5C illustrates a side view of the multifunction spacer-wire clip of FIG. 5A with example dimensions.
Figure 5D:
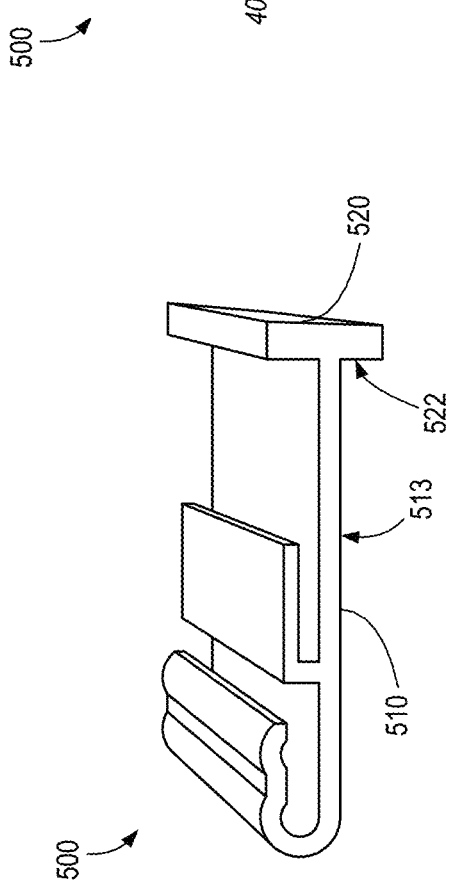
FIG. 5D illustrates a top view of the multifunction spacer-wire clip of FIG. 5A with example dimensions.
Figure 5A:
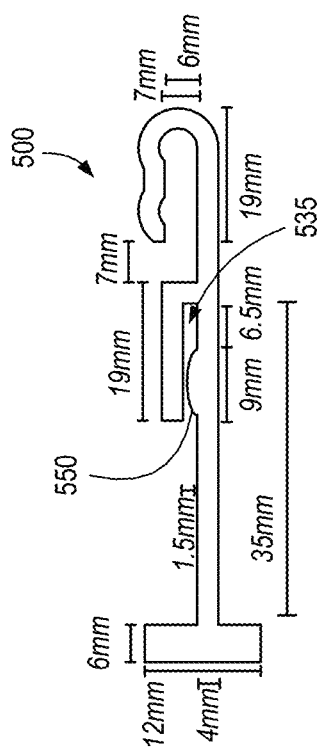
FIG. 5A illustrates a perspective view of a multifunction spacer-wire clip, according to one embodiment.

FIG. 5A illustrates a perspective view of a multifunction spacer-wire clip 500, according to one embodiment. As illustrated, the example spacer-wire clip 500 includes a main body portion 510, having an upper surface 511, and an opposing external surface 513. The upper surface 511 of the main body portion 510 may contact an external surface of a flange of a solar panel during installation. The main body portion 510 may be sized and positioned to space an external surface of the flange of the solar panel from an adjacent solar panel and prevent direct contact between the solar panel and the adjacent solar panel when the solar panel is positioned adjacent to the other solar panel in a stacked arrangement.

A flange overhang portion 530 may define a flange cavity 535 sized and configured to receive a portion of a flange of a solar panel. The flange cavity 535 may be defined between the upper surface 511 of the main body portion 510 and the flange overhang portion 530. Accordingly, an inner edge of the flange of a solar panel may be inserted within the flange cavity 535 such that the flange overhang portion 530 may be secured against the inner surface of the flange of the solar panel and the upper surface 511 of the main body portion 510 may be secured against the external surface of the flange of the solar panel. The edge of the flange of the solar panel may contact the inner surface of a connecting wall 532 connecting the flange overhang portion 530 to the main body portion 510 of the spacer-wire clip 500. In the illustrated example, the connecting wall 532 is vertical and forms 90-degree angles relative to the main body portion 510 and the flange overhang portion 530. In additional embodiments, the connecting wall 532 may be rounded or at different acute or obtuse angles relative to the main body portion 510 and the flange overhang portion 530.

A frame arm portion 520 may extend perpendicular to the main body portion 510 at an end of the main body portion 510. The frame arm portion 520 comprises a surface sized and located to be positioned against an outer perimeter of the frame of the solar panel and prevent the portion of the flange from removal from the flange cavity 535 when the frame arm portion 520 is positioned against the outer perimeter of the frame. Accordingly, the upper inside surface 521 of the frame arm portion 520 may contact the outer perimeter of a frame of a solar panel during installation, as described and illustrated in greater detail below.

The frame arm portion 520 may comprise a first portion 526 extending perpendicular to the main body portion 510 at a first end of the main body portion 510, the first portion 526 positioned to be adjacent to a solar panel when the spacer-wire clip 500 is installed on the solar panel. The frame arm portion 520 may further comprise a second portion 528 extending perpendicular to the main body portion 510 at the first end of the main body portion 510 and in a direction opposite the first portion 526, the second portion 528 positioned to be adjacent an edge of an adjacent solar panel when the spacer-wire clip 500 is installed on a solar panel and the solar panel is positioned adjacent to another solar panel in a stacked arrangement.

The main body portion 510 may continue past the connecting wall 532 in the same plane (as illustrated) or at an angle relative to a body extension 512 connected to a wire retainer 540. The wire retainer 540 may be positioned above and spaced apart from the body extension 512 to form a wire cavity 541. Accordingly, the wire retainer 540 extending from the main body portion 510 may be sized and configured to selectively retain at least one wire within at least one wire cavity 541. As shown, the wire cavity 541 may be configured to receive and retain wires of the solar panel and/or other data or power cables routed to, from, or past the solar panel. Additionally, the wire retainer 540 may include protrusions and/or intrusions 542 to receive and retain wires more effectively and prevent movement (e.g., lateral movement) of wires within the wire cavity 541. The illustrated embodiment shows two intrusions 542 to secure two separate wires spaced slightly from one another (or touching if the wires are thick enough) within the wire cavity 541.

The wire retainer 540 may be positioned on the main body portion 510 of the spacer-wire clip 500 such that an opening for inserting a wire into the wire cavity 541 of the wire retainer 540 is positioned at a location between the main body portion 510 of the spacer-wire clip 500 and the backing of a solar panel when the spacer-wire clip 500 is positioned on the solar panel.

It is appreciated that any number of frictional features, protrusions, intrusions, or other features may be present on the inner surface of the wire retainer 540 to secure any number of wires therein. In the illustrated embodiment, a curved wall 543 connects the wire retainer 540 to the body extension 512. The arcuate surface of a curved wall 543 may be specifically selected to accommodate a wire having a known diameter or wires having specific diameter ranges. Accordingly, the wire retainer 540 may comprise an arcuate surface with an inner radius substantially matching an outer radius of a wire of a solar panel. In additional embodiments, the curved wall 543 may be modified to be a straight wall at a 90-degree angle (or another angle) relative to the body extension 512 and the wire retainer 540.

Accordingly, the wire retainer 540 may be configured to open to allow the insertion of at least one wire into the wire cavity 541 in response to applying a force to the wire retainer 540 with the at least one wire. The wire retainer 540 may be configured to resiliently return to a closed position after a wire is positioned within the wire cavity 541. Additionally, one or more protrusion located at an opening into the wire cavity 541 may be positioned to provide resistance to the removal of a wire from the at least one wire cavity 541 after the wire is positioned therein.

Figure 5B:
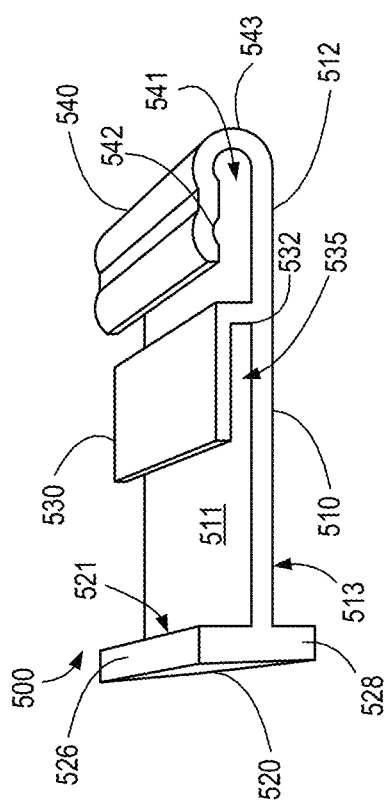
FIG. 5B illustrates another perspective view of the multifunction spacer-wire clip of FIG. 5A.

FIG. 5B illustrates another perspective view of the spacer-wire clip 500. The thickness of the main body portion 510 may be selected to provide a target spacing between solar panels stacked upon one another during shipping. Furthermore, the spacer-wire clip 500 may be manufactured with a shock absorptive polymer, plastic, and/or rubber to absorb shocks during shipping and maintain spacing to prevent scratching or other damage. In some embodiments, the external surface 513 of the spacer-wire clip 500 is in contact with adjacent solar panels during shipping (e.g., a top edge of a frame of an adjacent solar panel) and may be made from a polymer, plastic, and/or rubber selected to have target non-abrasive and/or impact absorption properties. In other embodiments, the external surface 513 may include a polymer, plastic, and/or rubber coating or layer selected to have target non-abrasive and/or impact absorption properties that is a different material than the rest of the spacer-wire clip 500. A lower inside surface 522 of the frame arm portion 520 may likewise be made from, include a coating, or include a layer of a polymer, plastic, and/or rubber selected to have target non-abrasive and/or impact absorption properties.

In some embodiments, the entire spacer-wire clip 500 may be a monolithic structure manufactured from a single material selected to retain wires within the wire cavity 541 for many years, remain secured to the flange and frame of the solar panel for many years, and provide sufficient impact and/or abrasion protection during shipping. The spacer-wire clip 500 may be manufactured using, for example, and without limitation, nylon, polyethylene, a composite nylon polyamide with polyethylene fibers, copolymer acetal, acetal homopolymer, polyamide, rubber-coated nylon, acrylate, or the like. In some embodiments, a removable or permanent rubber or foam layer may be applied to the external surface 513 of the main body portion 510 to increase the impact absorption properties of the spacer-wire clip 500.

FIG. 5C illustrates a side view of the multifunction spacer-wire clip 500 with example dimensions. The example dimensions are specifically selected based on the thickness and dimensions of the frame and flange of a particular solar panel. The exact dimensions, spacings, and thicknesses can be adapted and adjusted to accommodate solar panel frames and flanges of various shapes and sizes. Similarly, the dimensions, spacings, and thicknesses can be adapted and adjusted to accommodate a different number of wires and/or different thicknesses of wires.

In some embodiments, the flange of the solar panel may have predrilled holes or indents. The spacer-wire clip 500 may, as illustrated, include a protrusion 550 within the flange cavity 535. The protrusion 550 may extend from main body portion 510 and be sized and positioned to mate with an aperture in the flange of a solar panel to align the spacer-wire clip 500 with a location on the solar panel and maintain the position of the spacer-wire clip 500 at the location on the solar panel.

The protrusion 550 may be sized to enter or partially enter the predrilled hole or indent in the flange of a solar panel. The protrusion 550 may serve to align the spacer-wire clip 500 in specific locations on the flange of the solar panel and prevent the spacer-wire clip 500 from sliding laterally along the flange. In some embodiments, the solar panel may, for example, have holes drilled at predetermined intervals along the flange that can be used to position spacer-wire clips 500 in target locations along the flange prior to shipping. The spacer-wire clips 500 may be retained in the same locations during installation and use of the solar panel or moved to new locations along the flange (e.g., corresponding to alternative predrilled holes in the flange).

FIG. 5D illustrates a top view of the multifunction spacer-wire clip 500 with example dimensions. Again, it is appreciated that different widths between approximately 10 millimeters and 80 millimeters may be utilized to provide different amounts of spacer protection during shipping and/or wire retention strengths during installation and use of the solar panel. The length of the spacer-wire clip is illustrated as an example 67 millimeters but may be modified depending on the thickness of the frame of the solar panel, the width of the flange of the solar panel, the number of wires to be retained within the wire cavity, and/or the diameter(s) of the wire(s) to be retained within the wire cavity. Additionally, as shown, the spacer-wire clip 500 may have a substantially uniform width (e.g., about 40 mm) along the entire length of the spacer-wire clip 500.

FIG. 5E illustrates a perspective view of the multifunction spacer-wire clip 500 next to a flange 595 of a solar panel. In the illustrated example, a frame 590 of the solar panel is at a 90-degree angle relative to the flange 595 and the flange 595 includes a hole. The spacer-wire clip 500 may, in some embodiments, include a protrusion to interact with and partially enter the hole to retain the spacer-wire clip 500 on the flange 595 and prevent or limit lateral movement of the spacer-wire clip 500 along the flange 595.

FIG. 5F illustrates another perspective view of the multifunction spacer-wire clip 500 flexing for placement on the flange 595 of the solar panel, according to one embodiment. As described herein, the spacer-wire clip 500 may be manufactured using one or more materials or composites of materials (homogenous or layered) that allow for the spacer-wire clip 500 to be deformably flexed during installation and resiliently return to its original shape for long-term retention on the flange 595 of the solar panel.

FIG. 5G illustrates another perspective view of the multifunction spacer-wire clip 500 being placed on the flange 595 of the solar panel, according to one embodiment. As illustrated, the edge of the flange 595 enters the flange cavity 535, and the frame arm 520 is flexed downward to extend beyond the edge of the frame 590.

FIG. 5H illustrates another perspective view of the multifunction spacer-wire clip 500 secured to the flange 595 of the solar panel, according to one embodiment. As illustrated, the flange 595 is positioned within the flange cavity 535 and the upper portion of the frame arm 520 is secured to the outer surface of the frame 590. Again, in some embodiments, a protrusion within the flange cavity 535 may interact with the hole in the flange 595.

Figure 6B:
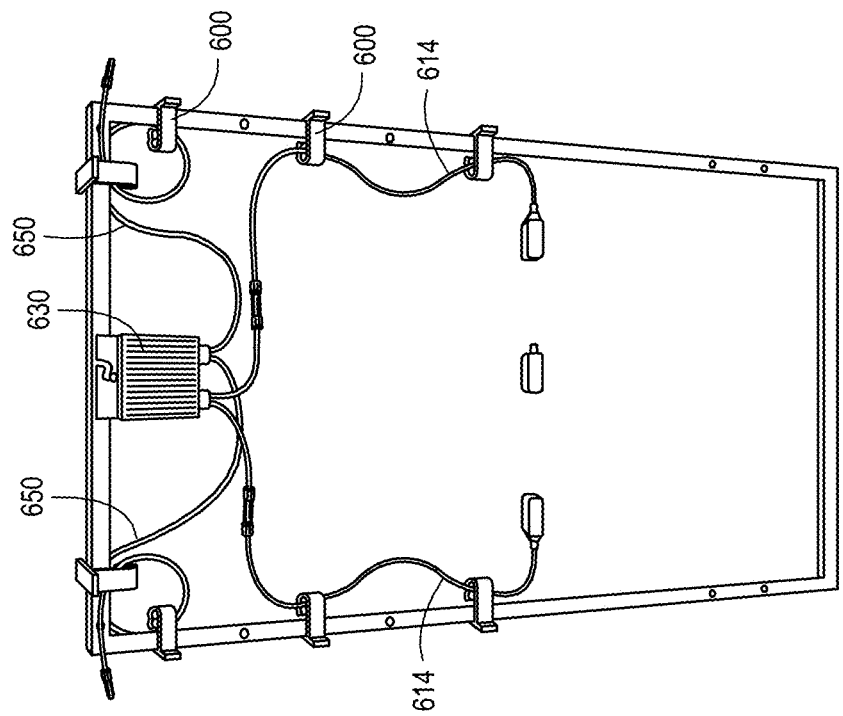
FIG. 6B illustrates the multifunction spacer-wire clips used for cable routing during installation, according to one embodiment.
Figure 6A:
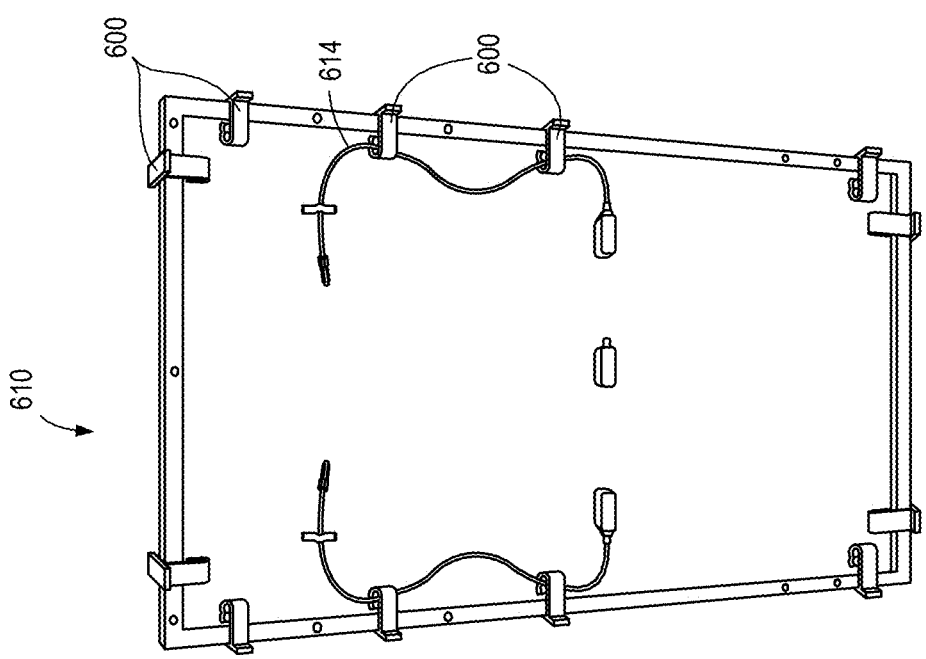
FIG. 6A illustrates multifunction spacer-wire clips secured to a solar panel during shipping, according to one embodiment.

FIG. 6A illustrates multifunction spacer-wire clips 600 (e.g., spacer-wire clips 500, 700, 800, 900, 1000, 1100, 1200, 1220, 1240, 1260, 1280, 1300, and/or 1400) secured to a solar panel 610 during shipping, according to one embodiment. As illustrated, and in contrast to the images and illustrations of FIGS. 1-4A, the spacer-wire clips 600 are used to route the negative and positive lead wires 614 of the solar panel 610 during shipping, thereby avoiding the need to coil and zip tie the wires 614. The ends of the wires 614 may be taped, as illustrated, to the back of the solar panel 610. Alternatively, the ends of the wires 614 (e.g., with MC4 connectors) may be positioned more closely to the spacer-wire clips 600 to avoid the need for any tape. The configuration shown in FIG. 6A may be used to stack and ship the solar panels 610, with the spacer-wire clips 600 serving the dual functions of spacing the solar panels 610 to avoid abrasion, providing impact absorption and solar panel separation, and securing the wires 614 during shipping.

FIG. 6B illustrates the multifunction spacer-wire clips 600 used for cable routing during installation, according to one embodiment. As illustrated, the spacer-wire clips 600 used for shipping in FIG. 6A are now used for routing the wire leads to the newly installed microinverter or power optimizer 630. Some of the additional spacer-wire clips 600 in the upper corners used for shipping protection in FIG. 6A are now used to route the external facing wires 650 of the microinverter or power optimizer 630. In the example embodiment, the unused spacer-wire clips 600 in the bottom corners are removed prior to installation and use of the solar panel 610 since they were not needed for wire routing. However, in other embodiments, the unused spacer-wire clips 600 in the bottom corners may be left in place and simply not used for wire routing.

Figure 7:
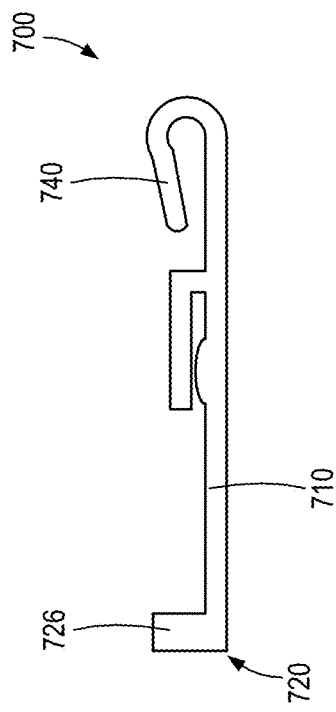
FIG. 7 illustrates an embodiment of a multifunction spacer-wire clip with a dynamic wire retainer and a single-direction frame arm, according to one embodiment.

FIG. 7 illustrates an embodiment of a multifunction spacer-wire clip 700 with a dynamic wire retainer 740 and a single-direction frame arm 720 having a first portion 726 extending perpendicular to a main body portion 710 at a first end of the main body portion 710, according to one embodiment. The dynamic wire retainer 740 may function to selectively secure one wire or multiple wires having different diameters by flexing upward relative to the underlying main body portion 710 and resiliently returning to substantially the same position and shape after a wire is inserted. The first portion 726 may be positioned to be adjacent to a solar panel when the spacer-wire clip 700 is installed on the solar panel, and the single-direction frame arm 720 may not include a second portion extending perpendicular to the main body portion 710 at the first end of the main body portion 710 and in a direction opposite the first portion 726.

Figure 8:
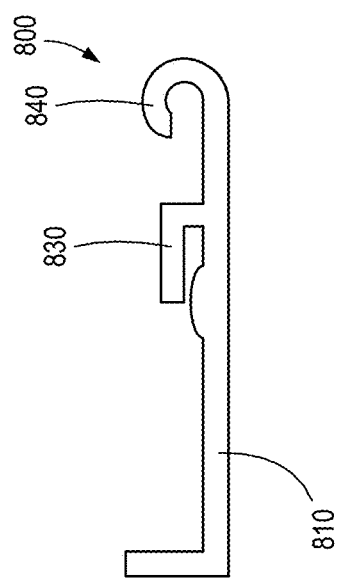
FIG. 8 illustrates an embodiment of a multifunction spacer-wire clip with a single cable clip and a shortened flange overhang portion, according to one embodiment.

FIG. 8 illustrates an embodiment of a multifunction spacer-wire clip 800 with a single cable clip (e.g., wire retainer 840 to accommodate a single wire) and a shortened flange overhang portion 830, according to one embodiment. The shortened flange overhang portion 830 may make for easier placement that requires less flexing of a main body portion 810.

Figure 9:
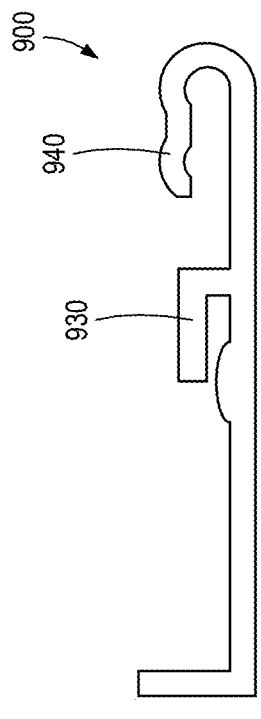
FIG. 9 illustrates an embodiment of a multifunction spacer-wire clip with a dual-cable clip and a shortened flange overhang portion, according to one embodiment.

FIG. 9 illustrates an embodiment of a multifunction spacer-wire clip 900 with a dual-cable clip (e.g., wire retainer 940 to accommodate two wires) and a shortened flange overhang portion 930, according to one embodiment.

FIG. 10 illustrates an embodiment of a multifunction spacer-wire clip 1000 with a dual-direction frame arm 1020 without an alignment protrusion, according to one embodiment. The upper portion 1026 of the dual-direction frame arm 1020 may extend around the frame of a solar panel on which the spacer-wire clip 1000 is mounted. The lower portion 1028 of the dual-direction frame arm 1020 may extend around the frame of an adjacent solar panel during shipping to maintain the solar panel stack alignment during shipping. In some embodiments, the lower portion 1028 of the dual-direction frame arm 1020 may be selectively removed (e.g., cut or flexibly broken off at an intentionally weakened joint) after shipping.

FIG. 11 illustrates an embodiment of a multifunction spacer-wire clip 1100 with a single-direction frame arm 1120 without an alignment protrusion, according to one embodiment. As previously described, some embodiments of the spacer-wire clip 1100 may ship with the single-direction frame arm 1120. Such embodiments may not offer stack alignment functionality during shipping, but such functionality may not be necessary for some implementations. In other embodiments, the spacer-wire clip 1100 may be shipped with a lower portion of the frame arm 1120 in place to provide stack alignment functionality during shipping, as shown in FIG. 10. The spacer-wire clip may then be transitioned to the embodiment shown in FIG. 11 by removing (e.g., by cutting or breaking) the lower portion of the frame arm 1100 after shipping for flush mounting the flange of the solar panel during installation and solar panel usage.

Figure 12A:
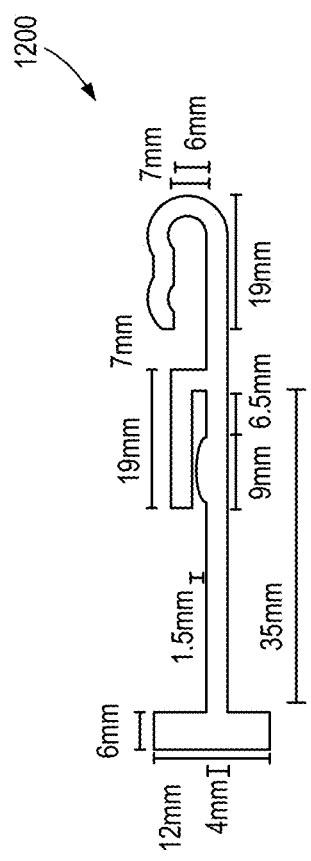
FIG. 12A illustrates a side view of a narrow multifunction spacer-wire clip, according to one embodiment.

FIG. 12A illustrates a side view of a narrow multifunction spacer-wire clip 1200, according to one embodiment. As illustrated, the dimensions of the spacer-wire clip 1200 in FIG. 12A are the same as those of spacer-wire clip 500 shown in FIG. 5C.

Figure 12B:
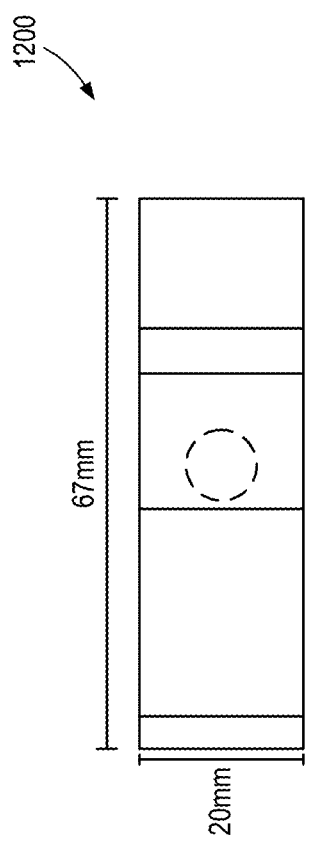
FIG. 12B illustrates a top view of the narrow multifunction spacer-wire clip, according to one embodiment.

FIG. 12B illustrates a top view of the narrow multifunction spacer-wire clip 1200. In contrast to the spacer-wire clip 500 of FIG. 5D, the narrow multifunction spacer-wire clip 1200 is only 20 millimeters wide, instead of 40 millimeters wide. Again, the exact dimensions may be adapted for a particular application and usage scenario.

Figure 12E:
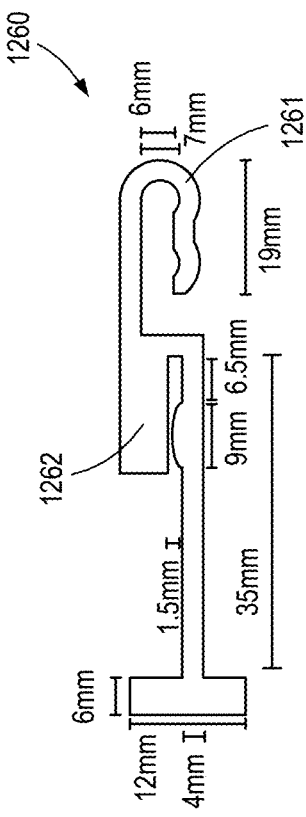
FIG. 12E illustrates a side view of an additional multifunction spacer-wire clip with the wire retainer inverted and extending from the flange overhang portion, according to one embodiment.
Figure 12F:
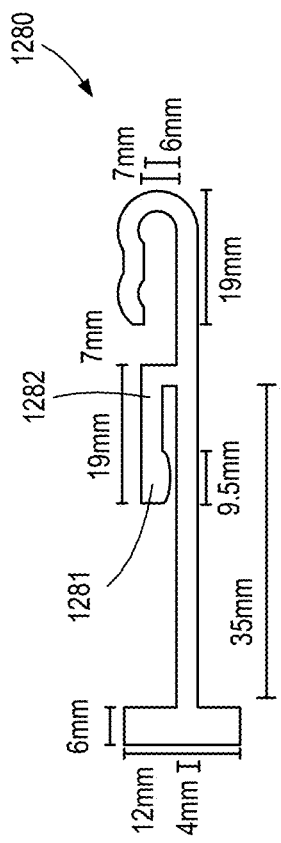
FIG. 12F illustrates a side view of an additional multifunction spacer-wire clip with a protrusion formed on the flange overhang portion, according to one embodiment.
Figure 12C:
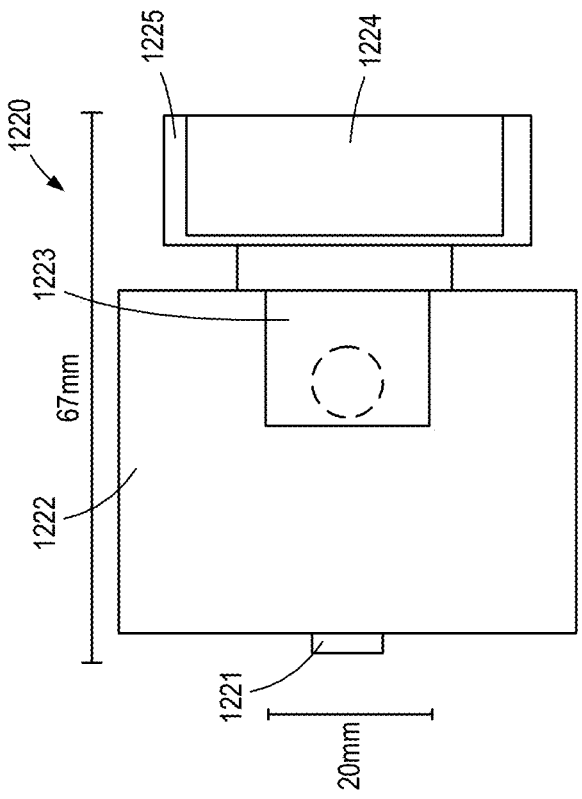
FIG. 12C illustrates a top view of an additional multifunction spacer-wire clip with variable widths, according to one embodiment.

FIG. 12C illustrates a top view of an additional multifunction spacer-wire clip 1220 with variable widths, according to one embodiment. As illustrated, a frame arm 1221 may have a relatively small width and reduced thickness to minimize its appearance on the outer perimeter of the frame of an installed solar panel. The width of a main body portion 1222 may be larger to provide an increased surface area for impact absorption between solar panels during shipping. The width of a flange overhang portion 1223 may remain a sufficient size to maintain the edge of the flange within a flange cavity.

The width of a wire retainer 1224 may be enlarged to secure a larger portion of inserted wires, while the width of a body extension 1225 underneath the wires may be a different width (illustrated as slightly wider) to facilitate insertion of the wires within a wire cavity between the wire retainer 1224 and the body extension 1225. The portion of the body extension 1225 between the flange overhang portion 1223 and the wire cavity may be a different width as well, as illustrated.

Figure 12D:
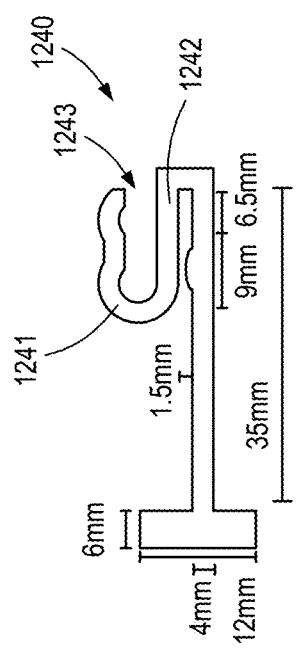
FIG. 12D illustrates a side view of an additional multifunction spacer-wire clip with the wire retainer positioned above the flange overhang portion, according to one embodiment.

FIG. 12D illustrates a side view of an additional multifunction spacer-wire clip 1240 with a wire retainer 1241 positioned above a flange overhang portion 1242, according to one embodiment. As illustrated, a curved wall and the wire retainer 1241 extend from and are positioned above the flange overhang portion 1242. In the illustrated embodiment, a wire cavity 1243 is formed between the upper surface of the flange overhang portion 1242 and the wire retainer 1241. During installation, wires may be positioned within the wire cavity 1243 that is above the flange of the solar panel.

FIG. 12E illustrates a side view of an additional multifunction spacer-wire clip 1260 with a wire retainer 1261 inverted and extending from a flange overhang portion 1262, according to one embodiment.

FIG. 12F illustrates a side view of an additional multifunction spacer-wire clip 1280 with a protrusion 1281 extending from a flange overhang portion 1282, according to one embodiment. The protrusion 1281 may be sized and positioned to interact with (e.g., partially enter) a hole in the flange of a solar panel. The protrusion 1281 may facilitate placement and alignment of the spacer-wire clip 1280 and prevent the spacer-wire clip 1280 from sliding laterally along the flange of the solar panel. In some embodiments the protrusion 1281 may have a circular or oval shape with a diameter corresponding to that of the holes in the flange of a solar panel. For example, the circular (or oval) protrusion 1281 may have a diameter (or major and minor axes) between approximately 3 millimeters and 12 millimeters. The height of the protrusion 1281 may correspond to the thickness of the flange of the solar panel. For example, the protrusion 1281 may have a height between approximately 1 millimeter and 5 millimeters.

One purpose of describing the additional spacer-wire clips 1220, 1240, 1260, 1280 illustrated in FIGS. 12C, 12D, 12E, and 12F is to emphasize that the exact dimensions, widths, and thicknesses may be uniform, but are not necessarily uniform. Variations in the specific widths and thicknesses may increase strength, absorptive properties, wire retention capabilities, etc., while reductions in specific widths and thicknesses may increase visual appearance (minimize intrusiveness), facilitate easier wire insertion, facilitate easier flange/frame mounting, etc. Another purpose of providing FIGS. 12C, 12D, 12E, and 12F is to illustrate that the wire retainer portion 1224, 1241, 1261 of the spacer-wire clips 1220, 1240, 1260, 1280 may be moved, repositioned, resized, and/or inverted with respect to the rest of the spacer-wire clip 1220, 1240, 1260, 1280.

Figure 13B:
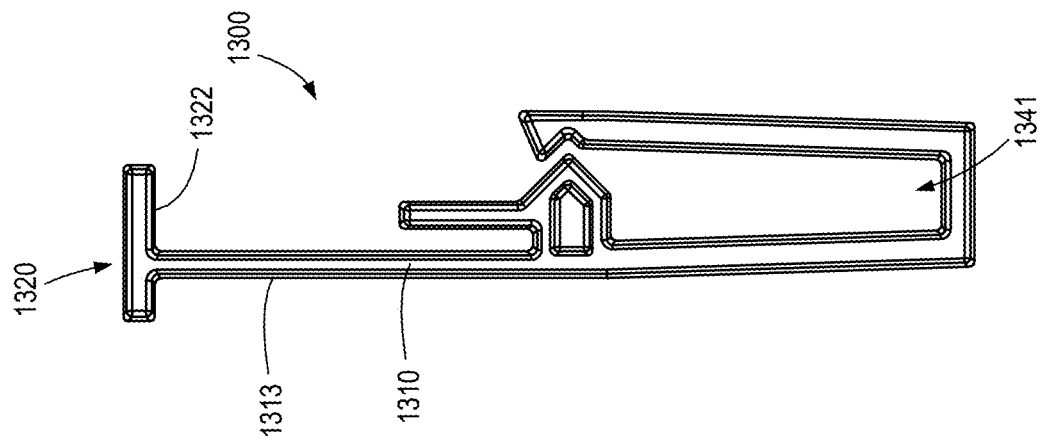
FIG. 13B illustrates a side view of the multifunction spacer-wire clip of FIG. 13A, according to one embodiment.
Figure 13A:
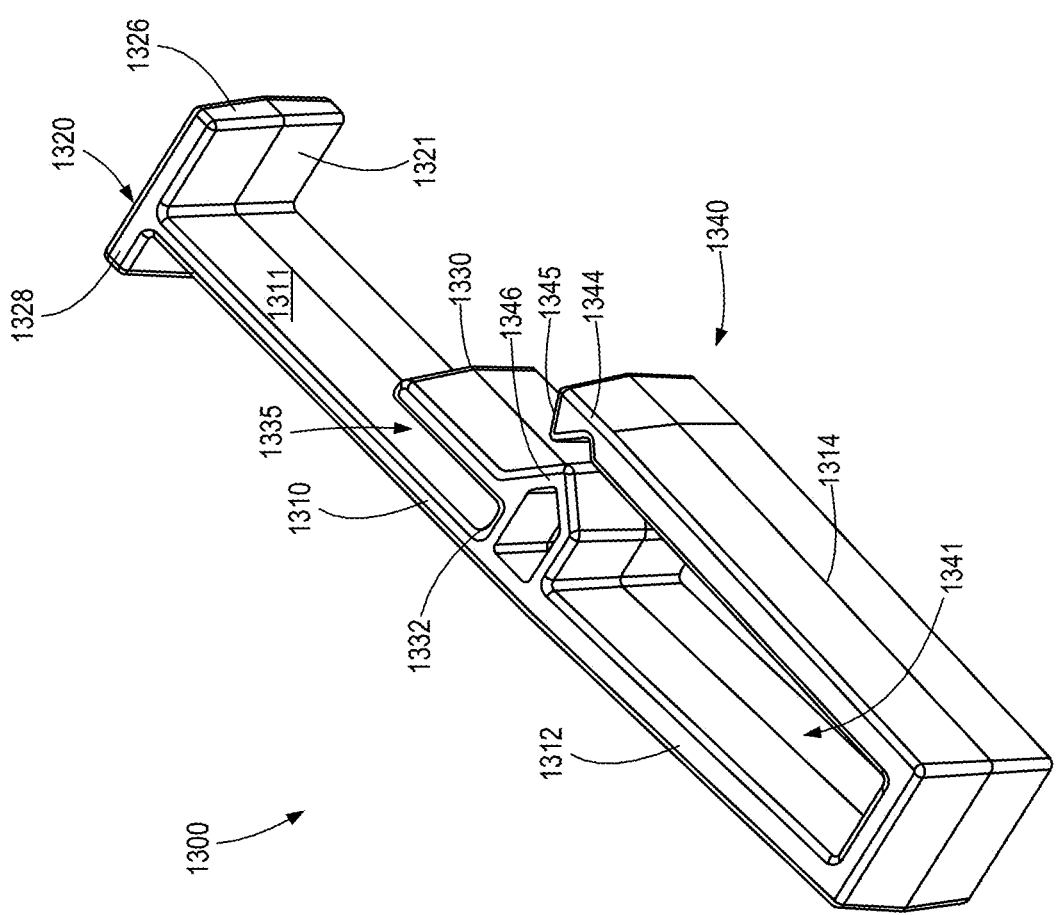
FIG. 13A illustrates an isometric view of a multifunction spacer-wire clip with a wire cavity configured to accommodate a plurality of wires, according to an additional embodiment.

FIG. 13A illustrates an isometric view of a multifunction spacer-wire clip 1300 with wire cavity 1341 configured to accommodate a plurality of wires, according to an additional embodiment. As illustrated, the spacer-wire clip 1300 includes a main body portion 1310, having an upper surface 1311, and an opposing external surface 1313 (FIG. 13B). The upper surface 1311 of the main body portion 1310 may contact an external surface of a flange of a solar panel during installation. The main body portion 1310 may be sized and positioned to space an external surface of the flange of the solar panel from an adjacent solar panel and prevent direct contact between the solar panel and the adjacent solar panel when the solar panel is positioned adjacent to the other solar panel in a stacked arrangement.

The spacer-wire clip 1300 may include a central part line 1314 from which surfaces of the spacer-wire clip 1300 may be tapered to facilitate the removal of the spacer-wire clip 1300 from a mold (e.g., an injection mold) during the manufacture of the spacer-wire clip 1300. Additionally, edges of the spacer-wire clip 1300 may be rounded to aid in manufacturing (e.g., to ease in machining of a mold and/or to prevent short shots in an injection molding process) and/or to provide smooth edges to prevent scratching of solar panels by operators handling the spacer-wire clips 1300.

A flange overhang portion 1330 may define a flange cavity 1335 sized and configured to receive a portion of a flange of a solar panel. The flange cavity 1335 may be defined between the upper surface 1311 of the main body portion 1310 and the flange overhang portion 1330. Accordingly, an inner edge of the flange of a solar panel may be inserted within the flange cavity 1335 such that the flange overhang portion 1330 may be secured against the inner surface of the flange of the solar panel and the upper surface 1311 of the main body portion 1310 may be secured against the external surface of the flange of the solar panel. The edge of the flange of the solar panel may contact the inner surface of a connecting wall 1332 connecting the flange overhang portion 1330 to the main body portion 1310 of the spacer-wire clip 1300.

A frame arm portion 1320 may extend perpendicular to the main body portion 1310 at an end of the main body portion 1310, The frame arm portion 1320 comprises a surface sized and located to be positioned against an outer perimeter of the frame of the solar panel and prevent the portion of the flange from removal from the flange cavity 1335 when the frame arm portion 1320 is positioned against the outer perimeter of the frame. Accordingly, an upper inside surface 1321 of the frame arm portion 1320 may contact the outer perimeter of a frame of a solar panel during installation, as described and illustrated in greater detail below.

The frame arm portion 1320 may comprise a first portion 1326 extending perpendicular to the main body portion 1310 at a first end of the main body portion 1310, the first portion 1326 positioned to be adjacent to a solar panel when the spacer-wire clip 1300 is installed on the solar panel. The frame arm portion 1320 may further comprise a second portion 1328 extending perpendicular to the main body portion 1310 at the first end of the main body portion 1310 and in a direction opposite the first portion 1326, the second portion 1328 positioned to be adjacent an edge of an adjacent solar panel when the spacer-wire clip 1300 is installed on a solar panel and the solar panel is positioned adjacent to another solar panel in a stacked arrangement.

The main body portion 1310 may continue past the connecting wall 1332 in the same plane (as illustrated) or at an angle relative to a body extension 1312 connected to a wire retainer 1340. The wire retainer 1340 may be positioned above and spaced apart from the body extension 1312 to form the relatively large wire cavity 1341. Accordingly, the wire retainer 1340 extending from the main body portion 1310 may be sized and configured to selectively retain at least one wire within at least one wire cavity 1341. As shown, the wire cavity 1341 may be configured to receive and retain a plurality of wires of the solar panel and/or other data or power cables routed to, from, or past the solar panel, that may be a variety of sizes in diameter.

The wire retainer 1340 may include a groove 1344 near an opening to the wire cavity 1341. The groove 1344 may correspond to a protrusion 1346 extending from the main body portion 1310 at a location adjacent to the flange overhang 1330. Additionally, an end 1345 of the wire retainer 1340 may be angled toward the opening to the wire cavity 1341. Accordingly, the end 1345 of the wire retainer 1340 and a surface of the protrusion 1346 may create a v-shaped opening to the wire cavity 1341 and may act to funnel wires into the wire cavity 1341 through the opening. Additionally, as force is applied to the end 1345 of the wire retainer 1340 with a wire, the force may push the end 1345 of the wire retainer 1340 away from the protrusion 1346 and allow passage of the wire into the wire cavity 1341. After the wire has been located within the wire cavity 1341, the wire retainer 1340 may resiliently return to its original shape and location, which may prevent the wire from exiting the wire cavity 1341 without a force being applied to the wire retainer 1340 sufficient to deform the wire retainer 1340.

In view of the foregoing, the wire retainer 1340 may accommodate a plurality of wires of a variety of sizes within the wire cavity 1341, which may be inserted and/or removed from the wire cavity 1341 of the wire retainer 1340 individually (e.g., one at a time) or all at once.

FIG. 13B illustrates a side view of the multifunction spacer-wire clip 1300. The thickness of the main body portion 1310 may be selected to provide a target spacing between solar panels stacked upon one another during shipping. Furthermore, the spacer-wire clip 1300 may be manufactured with a shock absorptive polymer, plastic, and/or rubber to absorb shocks during shipping and maintain spacing to prevent scratching or other damage. In some embodiments, the external surface 1313 of the spacer-wire clip 1300 is in contact with adjacent solar panels during shipping (e.g., a top edge of a frame of an adjacent solar panel) and may be made from a polymer, plastic, and/or rubber selected to have target non-abrasive and/or impact absorption properties. In other embodiments, the external surface 1313 may include a polymer, plastic, and/or rubber coating or layer, selected to have target non-abrasive and/or impact absorption properties, that is a different material than the rest of the spacer-wire clip 1300. The lower inside surface 1322 of the frame arm 1320 may likewise be made from, include a coating, or include a layer of a polymer, plastic, and/or rubber selected to have target non-abrasive and/or impact absorption properties.

In some embodiments, the entire spacer-wire clip 1300 may be a monolithic structure manufactured from a single material selected to retain wires within the wire cavity 1341 for many years, remain secured to the flange and frame of the solar panel for many years, and provide sufficient impact and/or abrasion protection during shipping. The spacer-wire clip 1300 may be manufactured using, for example, and without limitation, nylon, polyethylene, a composite nylon polyamide with polyethylene fibers, copolymer acetal, acetal homopolymer, polyamide, rubber-coated nylon, acrylate, or the like. In some embodiments, a removable or permanent rubber or foam layer may be applied to the external surface 1313 of the main body portion 1310 to increase the impact absorption properties of the spacer-wire clip 1300.

Figures 13C, 13D, 13E:
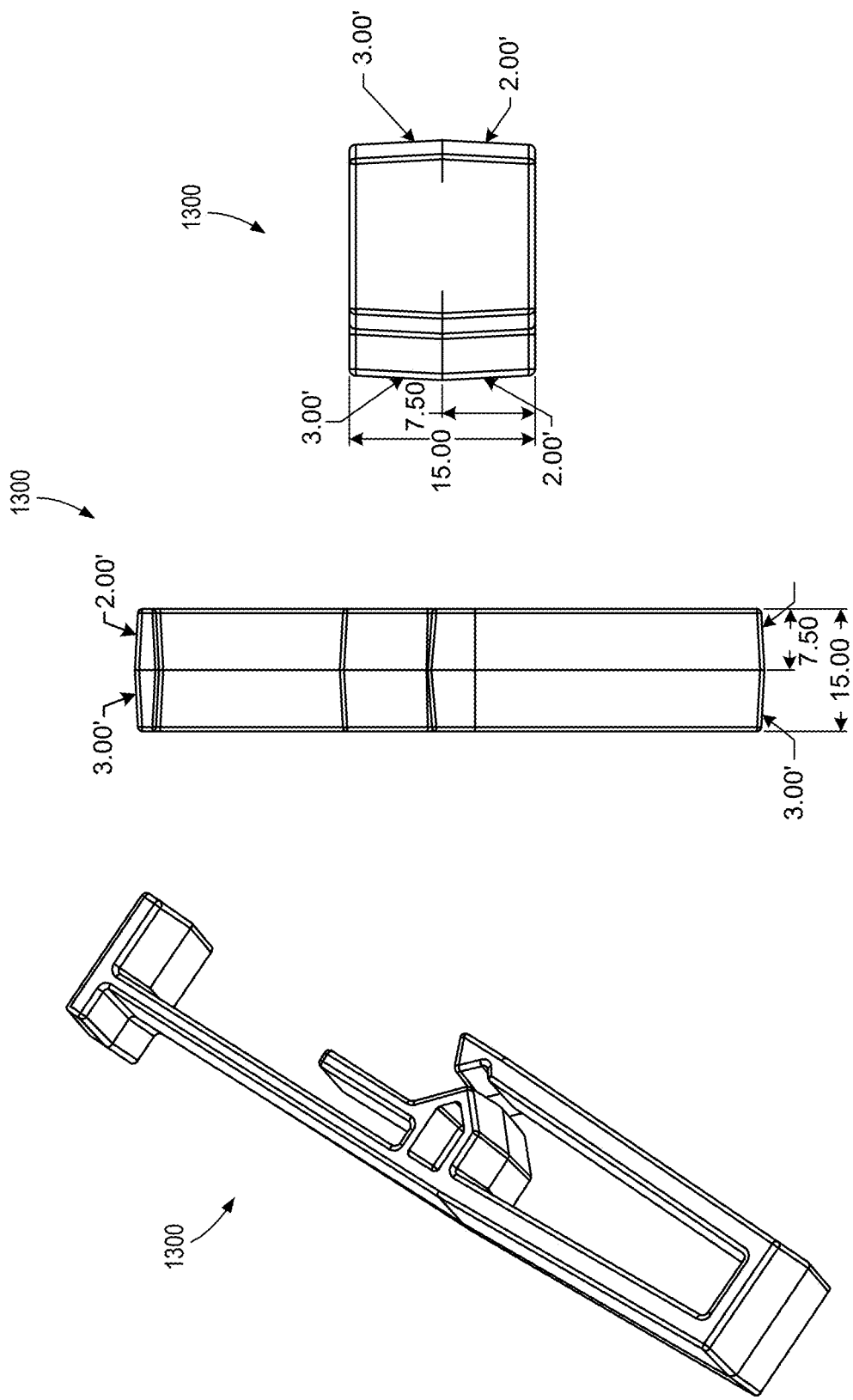
FIG. 13C illustrates an isometric back view of the multifunction spacer-wire clip of FIG. 13A, according to one embodiment.
FIG. 13D illustrates a front view of the multifunction spacer-wire clip of FIG. 13A according to one embodiment.
FIG. 13E illustrates an end view of the multifunction spacer-wire clip of FIG. 13A according to one embodiment.

FIG. 13C illustrates an isometric back view of the multifunction spacer-wire clip of FIG. 13A.

FIG. 13D illustrates a front view of the multifunction spacer-wire clip 1300 with example dimensions. The example dimensions are specifically selected based on the thickness and dimensions of the frame and flange of a particular solar panel. The exact dimensions, spacings, and thicknesses can be adapted and adjusted to accommodate solar panel frames and flanges of various shapes and sizes. Similarly, the dimensions, spacings, and thicknesses can be adapted and adjusted to accommodate a different number of wires and/or different thicknesses of wires.

FIG. 13E illustrates an end view of the multifunction spacer-wire clip 1300 with example dimensions.

FIG. 13F illustrates a perspective view of the multifunction spacer-wire clip 1300 next to a frame 1390 of a solar panel. The frame 1390 of the solar panel includes a flange 1395.

FIG. 13G illustrates another perspective view of the multifunction spacer-wire clip 1300 flexing for placement on the flange 1395 of the solar panel, according to one embodiment. As described herein, the spacer-wire clip 1300 may be manufactured using one or more materials or composites of materials (homogenous or layered) that allow for the spacer-wire clip 1300 to be deformably flexed during installation and resiliently return to its original shape for long-term retention on the flange 1395 of the solar panel.

FIG. 13H illustrates another perspective view of the multifunction spacer-wire clip 1300 being placed on the flange 1395 of the solar panel, according to one embodiment. As illustrated, the edge of the flange 1395 enters the flange cavity 1335, and the frame arm 1320 is flexed downward to extend beyond the edge of the frame 1390.

FIG. 13I illustrates another perspective view of the multifunction spacer-wire clip 1300 secured to the flange 1395 of the solar panel, according to one embodiment. As illustrated, the flange 1395 is positioned within the flange cavity 1335 and the upper portion of the frame arm 1320 is secured to the outer surface of the frame 1390.

Figure 14B:
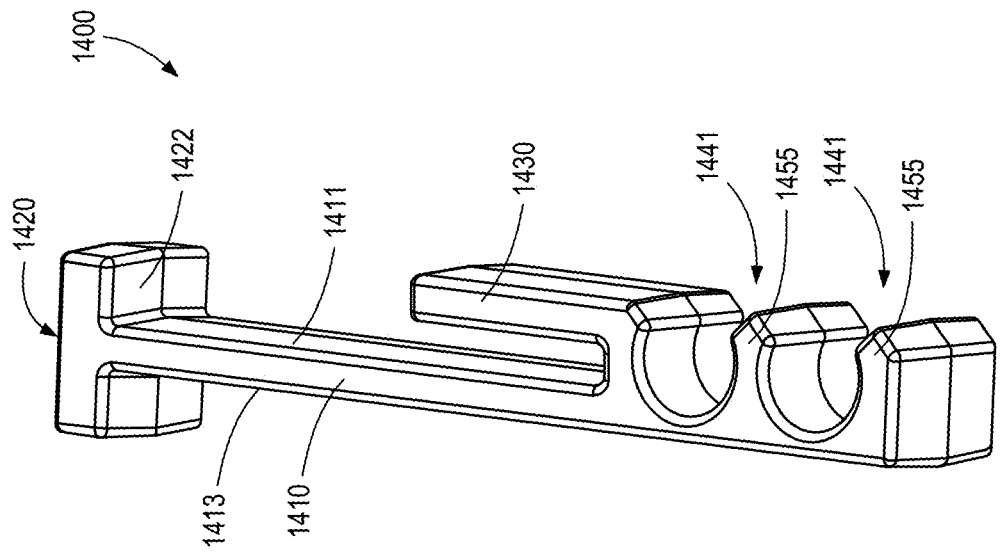
FIG. 14B illustrates an isometric front view of the multifunction spacer-wire clip of FIG. 14A according to one embodiment.
Figure 14A:
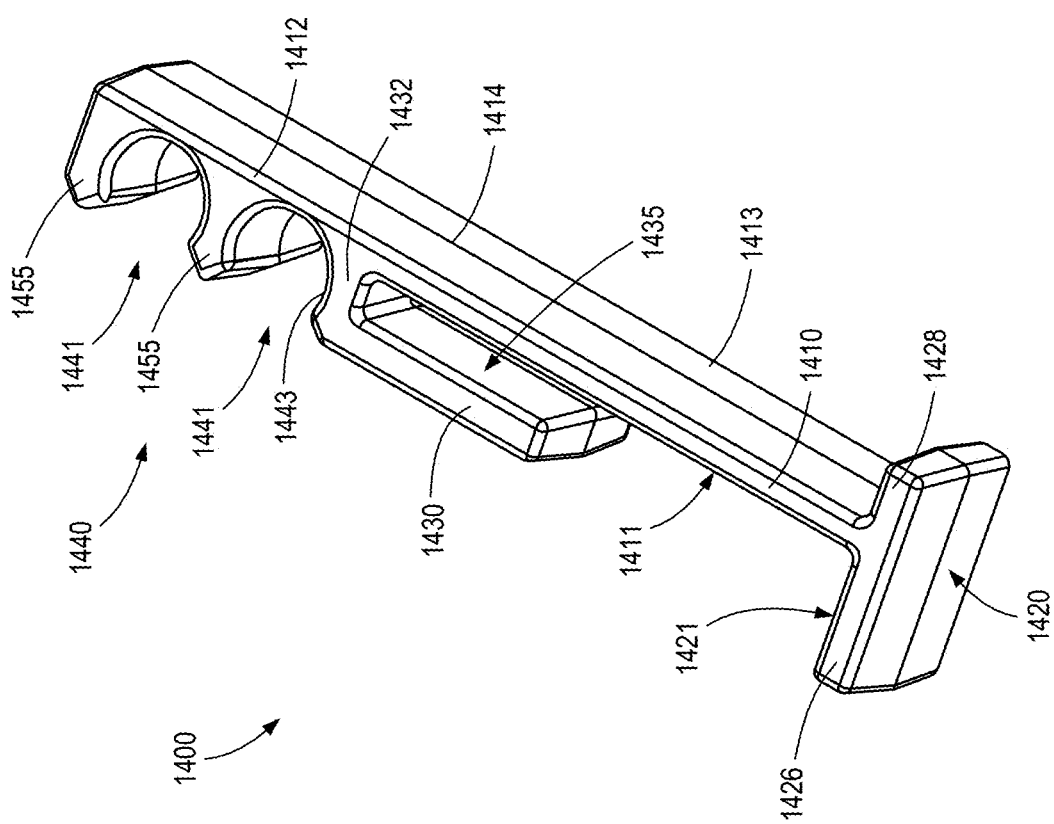
FIG. 14A illustrates an isometric view of a multifunction spacer-wire clip with multiple wire cavities each configured to accommodate a wire, according to an additional embodiment according to one embodiment.

FIG. 14A illustrates an isometric view of a multifunction spacer-wire clip 1400 with multiple wire cavities 1441 each configured to accommodate a wire, according to an additional embodiment. As illustrated, the spacer-wire clip 1400 includes a main body portion 1410, having an upper surface 1411, and an opposing external surface 1413. The upper surface 1411 of the main body portion 1410 may contact an external surface of a flange of a solar panel during installation. The main body portion 1410 may be sized and positioned to space an external surface of the flange of the solar panel from an adjacent solar panel and prevent direct contact between the solar panel and the adjacent solar panel when the solar panel is positioned adjacent to the other solar panel in a stacked arrangement.

The spacer-wire clip 1400 may include a central part line 1414 from which surfaces of the spacer-wire clip 1400 may be tapered to facilitate the removal of the spacer-wire clip 1400 from a mold (e.g., and injection mold) during the manufacture of the spacer-wire clip. Additionally, edges of the spacer-wire clip 1400 may be rounded to aid in manufacturing (e.g., to ease in machining of a mold and/or to prevent short shots in an injection molding process) and/or to provide smooth edges to prevent scratching of solar panels by operators handling the spacer-wire clip 1400.

A flange overhang portion 1430 may define a flange cavity 1435 sized and configured to receive a portion of a flange of a solar panel. The flange cavity 1435 may be defined between the upper surface 1411 of the main body portion 1410 and the flange overhang portion 1430. Accordingly, an inner edge of the flange of a solar panel may be inserted within the flange cavity 1435 such that the flange overhang portion 1430 may be secured against the inner surface of the flange of the solar panel and the upper surface 1411 of the main body portion 1410 may be secured against the external surface of the flange of the solar panel. The edge of the flange of the solar panel may contact the inner surface of a connecting wall 1432 connecting the flange overhang portion 1430 to the main body portion 1410 of the spacer-wire clip 1400.

A frame arm portion 1420 may extend perpendicular to the main body portion 1410 at an end of the main body portion 1410, The frame arm portion 1420 comprises a surface sized and located to be positioned against an outer perimeter of the frame of the solar panel and prevent the portion of the flange from removal from the flange cavity 1435 when the frame arm portion 1420 is positioned against the outer perimeter of the frame. Accordingly, the upper inside surface 1421 of the frame arm portion 1420 may contact the outer perimeter of a frame of a solar panel during installation, as described and illustrated in greater detail below.

The frame arm portion 1420 may comprise a first portion 1426 extending perpendicular to the main body portion 1410 at a first end of the main body portion 1410, the first portion 1426 positioned to be adjacent to a solar panel when the spacer-wire clip 1400 is installed on the solar panel. The frame arm portion 1420 may further comprise a second portion 1428 extending perpendicular to the main body portion 1410 at the first end of the main body portion 1410 and in a direction opposite the first portion 1426, the second portion 1428 positioned to be adjacent an edge of an adjacent solar panel when the spacer-wire clip 1400 is installed on a solar panel and the solar panel is positioned adjacent to another solar panel in a stacked arrangement.

The main body portion 1410 may continue past the connecting wall 1432 in the same plane (as illustrated) or at an angle relative to a body extension 1412 connected to a wire retainer 1440. The wire retainer 1440 may include arms 1455 extending from the body extension 1412 to form multiple wire cavities 1441 (e.g., two wire cavities 1441). Accordingly, the wire cavities 1441 of the wire retainer 1440 extending from the main body portion 1410 may be sized and configured to selectively retain a wire in a respective wire cavity 1441. As shown, each wire cavity 1441 may be configured to receive and retain a wire of the solar panel and/or other data or power cables routed to, from, or past the solar panel.

In the illustrated embodiment, each wire cavity 1441 may be defined by an arcuate surface of a curved wall 1443 specifically selected to accommodate a wire having a known diameter or wires having specific diameter ranges. Accordingly, each wire cavity 1441 may be defined by an arcuate surface with an inner radius substantially matching an outer radius of a wire of a solar panel.

Each wire cavity 1441 of the wire retainer 1440 may be configured to open to allow the insertion of at least one wire into the wire cavity 1441 in response to applying a force to the wire retainer 1440 with the at least one wire. The wire retainer 1440 may be configured to resiliently return to a closed position after a wire is positioned within a respective wire cavity 1441. Additionally, one or more protrusions located at an opening into a respective wire cavity 1441 may be positioned to provide resistance to the removal of a wire from the respective wire cavity 1441 after the wire is positioned therein.

In view of the foregoing, the wire retainer 1440 may accommodate a plurality of wires, each within a respective wire cavity 1441, which may be inserted and/or removed from the respective wire cavity 1441 of the wire retainer 1440 without first removing and/or inserting another wire from its respective wire cavity 1441.

FIG. 14B illustrates an isometric front view of the multifunction spacer-wire clip 1400. The thickness of the main body portion 1410 may be selected to provide a target spacing between solar panels stacked upon one another during shipping. Furthermore, the spacer-wire clip 1400 may be manufactured with a shock absorptive polymer, plastic, and/or rubber to absorb shocks during shipping and maintain spacing to prevent scratching or other damage. In some embodiments, the external surface 1413 of the spacer-wire clip 1400 is in contact with adjacent solar panels during shipping (e.g., a top edge of a frame of an adjacent solar panel) and may be made from a polymer, plastic, and/or rubber selected to have target non-abrasive and/or impact absorption properties. In other embodiments, the external surface 1413 may include a polymer, plastic, and/or rubber coating or layer, selected to have target non-abrasive and/or impact absorption properties, that is a different material than the rest of the spacer-wire clip 1400. A lower inside surface 1422 of the frame arm 1420 may likewise be made from, include a coating, or include a layer of a polymer, plastic, and/or rubber selected to have target non-abrasive and/or impact absorption properties.

In some embodiments, the entire spacer-wire clip 1400 may be a monolithic structure manufactured from a single material selected to retain wires within the wire cavities 1441 for many years, remain secured to the flange and frame of the solar panel for many years, and provide sufficient impact and/or abrasion protection during shipping. The spacer-wire clip 1400 may be manufactured using, for example, and without limitation, nylon, polyethylene, a composite nylon polyamide with polyethylene fibers, copolymer acetal, acetal homopolymer, polyamide, rubber-coated nylon, acrylate, or the like. In some embodiments, a removable or permanent rubber or foam layer may be applied to the external surface 1413 of the main body portion 1410 to increase the impact absorption properties of the spacer-wire clip 1400.

Figure 14E:
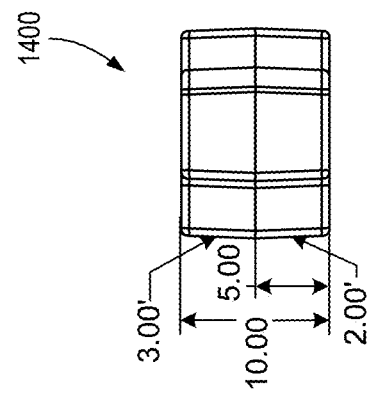
FIG. 14E illustrates an end view of the multifunction spacer-wire clip of FIG. 14A according to one embodiment.
Figure 14D:
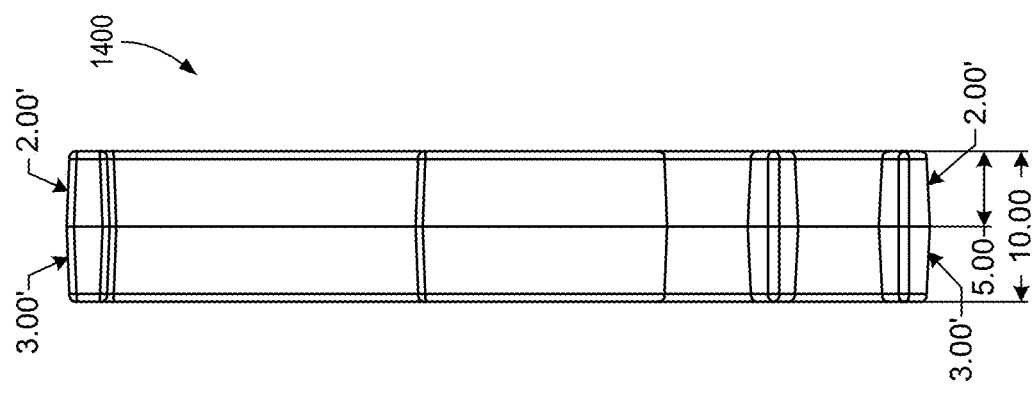
FIG. 14D illustrates a front view of the multifunction spacer-wire clip of FIG. 14A according to one embodiment.
Figure 14C:
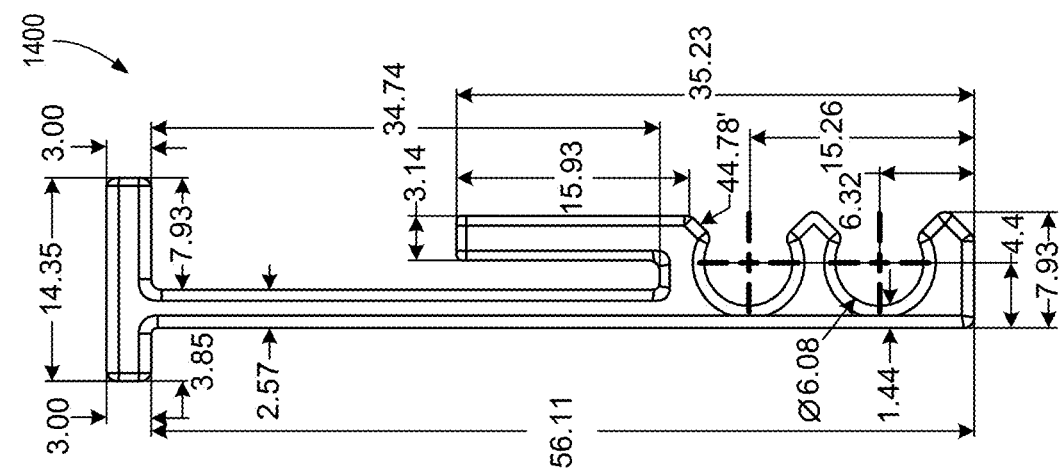
FIG. 14C illustrates a side view of the multifunction spacer-wire clip of FIG. 14A according to one embodiment.

FIG. 14C illustrates a side view of the multifunction spacer-wire clip 1400 with example dimensions.

FIG. 14D illustrates a front view of the multifunction spacer-wire clip 1400 with example dimensions.

FIG. 14E illustrates an end view of the multifunction spacer-wire clip 1400 with example dimensions.

Figure 14G:
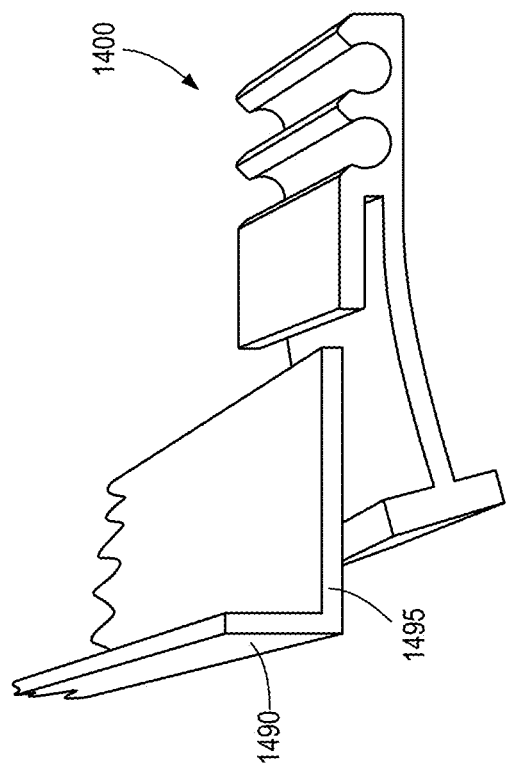
FIG. 14G illustrates another perspective view of the multifunction spacer-wire clip of FIG. 14A flexing for placement on the flange of the solar panel according to one embodiment.
Figure 14I:
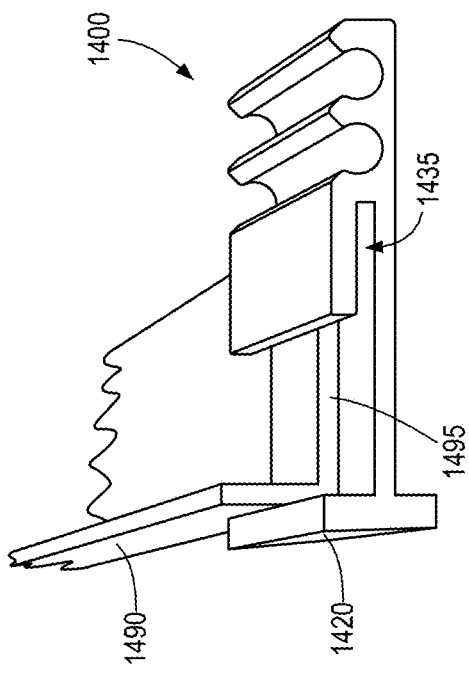
FIG. 14I illustrates another perspective view of the multifunction spacer-wire clip of FIG. 14A secured to the flange of the solar panel according to one embodiment.
Figure 14F:
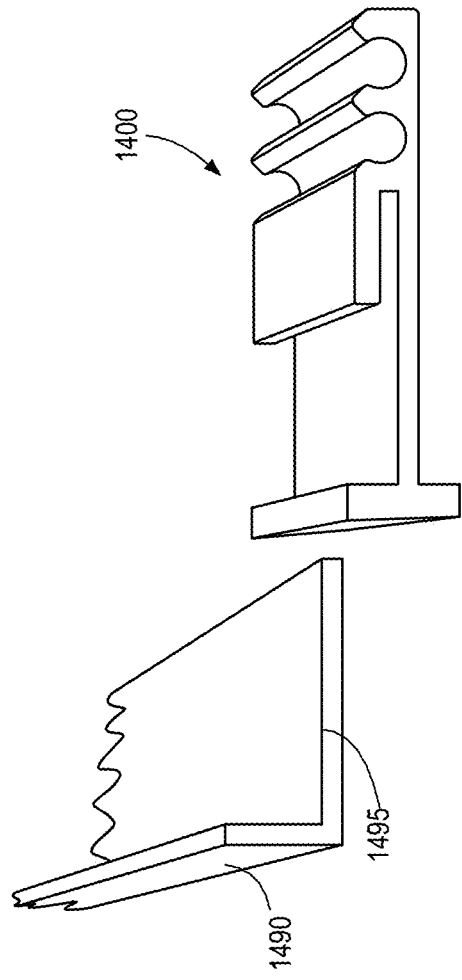
FIG. 14F illustrates a perspective view of the multifunction spacer-wire clip of FIG. 14A next to a flange of a solar panel according to one embodiment.

FIG. 14F illustrates a perspective view of the multifunction spacer-wire clip 1400 next to a frame 1490 of a solar panel. The frame 1490 of the solar panel includes a flange 1495.

FIG. 14G illustrates another perspective view of the multifunction spacer-wire clip 1400 flexing for placement on the flange 1495 of the solar panel, according to one embodiment. As described herein, the spacer-wire clip 1400 may be manufactured using one or more materials or composites of materials (homogenous or layered) that allow for the spacer-wire clip 1400 to be deformably flexed during installation and resiliently return to its original shape for long-term retention on the flange 1495 of the solar panel.

Figure 14H:
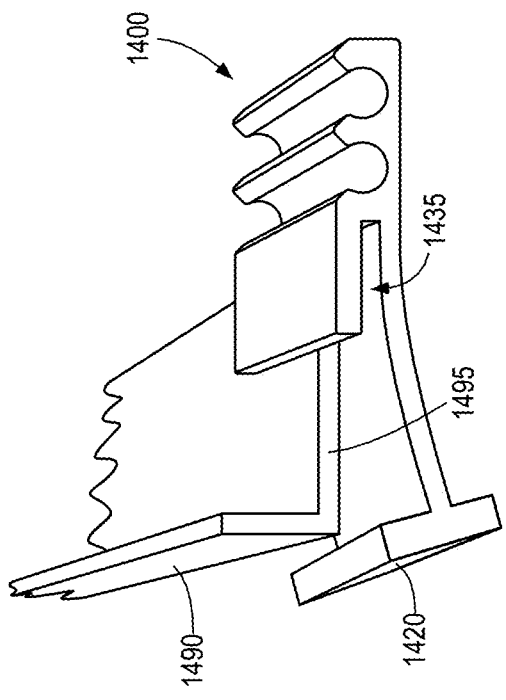
FIG. 14H illustrates another perspective view of the multifunction spacer-wire clip of FIG. 14A being placed on the flange of the solar panel according to one embodiment.

FIG. 14H illustrates another perspective view of the multifunction spacer-wire clip 1400 being placed on the flange 1495 of the solar panel, according to one embodiment. As illustrated, the edge of the flange 1495 enters the flange cavity 1435, and the frame arm 1420 is flexed downward to extend beyond the edge of the frame 1490.

FIG. 14I illustrates another perspective view of the multifunction spacer-wire clip 1400 secured to the flange 1495 of the solar panel, according to one embodiment. As illustrated, the flange 1495 is positioned within the flange cavity 1435 and the upper portion of the frame arm 1420 is secured to the outer surface of the frame 1490.

In view of the foregoing, multifunctional spacer-wire clips according to embodiments of the present disclosure may be utilized for both packaging solar panels and installing solar panels.

For example, a solar panel may be packaged by coupling a plurality of spacer-wire clips (e.g., spacer-wire clips 500, 700, 800, 900, 1000, 1100, 1200, 1220, 1240, 1260, 1280, 1300, and/or 1400) to a flange of a solar panel, such as by inserting a portion of the flange into a flange cavity of each of the plurality of spacer-wire clips. To secure the wires during shipping and handling, at least one wire of the solar panel may be positioned in a wire retainer of at least one of the plurality of spacer-wire clips, such as by applying a force with the at least one wire to a protrusion at an opening of a wire cavity and forcing the at least one wire past the protrusion into the wire cavity. The solar panel may be placed in a stack of solar panels where the solar panel may be spaced from an adjacent solar panel with the plurality of spacer-wire clips.

A solar panel installer may then install the solar panel by obtaining the stack of solar panels including the solar panel with the plurality of spacer-wire clips attached spacing the solar panel from an adjacent solar panel in a stack of solar panels. After obtaining the stack of solar panels the solar panel may be separated from the adjacent solar panel and placed in its working location (e.g., on a roof). An operator may then route one or more wires in their final installed location by inserting at least one wire into a cavity of a wire retainer of at least one spacer-wire clip of the plurality of spacer-wire clips and secure the one or more wires relative to the solar panel.

This disclosure contemplates a general multifunction spacer-wire clip that includes, in broad terms, (i) securing features to secure the spacer-wire clip to the flange of a solar panel, (ii) spacer features to space the solar panel from other solar panels in a stack of solar panels during shipping, where the spacer features function to protect the solar panel during shipping, and (iii) wire retaining features to retain at least one wire during installation and usage of the solar panel. The specific securing features, spacing features, and retaining features in the illustrated spacer-wire clips are merely examples of such features. It is contemplated that the relative dimensions, specific dimensions, and relative positioning of each of the three general features may be adapted and modified to fit a particular solar panel and/or to attain target positioning or performance characteristics.

The variously described embodiments of spacer-wire clips reduce or eliminate waste that is normally generated during the solar panel shipping process, including disposable spacer clips, zip ties, tape, and/or other packaging materials. A single spacer-wire clip performs the functions of a traditional spacer clip and a traditional wire clip, with improved performance and reliability. Additionally, embodiments of the spacer-wire clips that include dual-direction frame arms prevent stacked solar panels from shifting relative to one another during transportation.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The specific angles, lengths, widths, thicknesses, surface features, friction components, deformation characteristics, and/or impact absorption characteristics of the spacer-wire clips may be adjusted for a particular application. The scope of this patent application and the described inventions encompasses the illustrated examples, the various embodiments as described, the variations set forth above, the variations that would be apparent to those of skill in the art, and those embodiments encompassed by the following claims.

What is claimed is:

1. A spacer-wire clip to be secured to a solar panel, comprising:
   a flange overhang portion defining a flange cavity sized and configured to receive a portion of a flange of a first solar panel;
   a main body portion sized and positioned to space an external surface of the flange of the first solar panel from an adjacent second solar panel and prevent direct contact between the first solar panel and the second solar panel when the first solar panel is positioned adjacent to the second solar panel in a stacked arrangement;
   a frame arm portion comprising a surface sized and located to be positioned against an outer perimeter of a frame of the first solar panel and prevent the portion of the flange from removal from the flange cavity when the frame arm portion is positioned against the outer perimeter of the frame; and
   a wire retainer extending from the main body portion sized and configured to selectively retain at least one wire within at least one wire cavity,
   wherein the frame arm portion comprises:
      a first portion extending perpendicular to the main body portion at a first end of the main body portion, the first portion positioned to be adjacent to the first solar panel when the spacer-wire clip is installed on the first solar panel, and
      a second portion extending perpendicular to the main body portion at the first end of the main body portion and in a direction opposite the first portion, the second portion positioned to be adjacent an edge of the second solar panel when the spacer-wire clip is installed on the first solar panel and the second solar panel is positioned adjacent to the first solar panel in the stacked arrangement.

2. The spacer-wire clip of claim 1, wherein the spacer-wire clip is a monolithic structure.

3. The spacer-wire clip of claim 2, wherein the spacer-wire clip is made of a resilient material.

4. The spacer-wire clip of claim 3, wherein the spacer-wire clip is made of a polymer.

5. The spacer-wire clip of claim 1, wherein the wire retainer is configured to open to allow insertion of the at least one wire into the at least one wire cavity in response to applying a force to the wire retainer with the at least one wire.

6. The spacer-wire clip of claim 5, wherein the wire retainer is configured to resiliently return to a closed position after the at least one wire is positioned within the at least one wire cavity.

7. The spacer-wire clip of claim 1, wherein the wire retainer comprises an arcuate surface with an inner radius matching an outer radius of a wire of the first solar panel.

8. The spacer-wire clip of claim 1, wherein the wire retainer comprises a plurality of wire cavities.

9. The spacer-wire clip of claim 1, wherein an opening for inserting a wire into the at least one wire cavity of the wire retainer is positioned at a location between the main body portion of the spacer-wire clip and a backing of the first solar panel when the spacer-wire clip is positioned on the first solar panel.

10. The spacer-wire clip of claim 1, wherein the wire retainer comprises at least one protrusion located at an opening into the at least one wire cavity, the protrusion positioned to provide resistance to removal of a wire from the at least one wire cavity.

11. The spacer-wire clip of claim 1, further comprising a protrusion on the main body portion sized and positioned to mate with an aperture in the flange of the first solar panel to align the spacer-wire clip with a location on the first solar panel and maintain a position of the spacer-wire clip at the location on the first solar panel.

12. The spacer-wire clip of claim 1, wherein the spacer-wire clip has a uniform width along an entire length of the spacer-wire clip.

13. The spacer-wire clip of claim 1, wherein the spacer-wire clip has a varying width along a length of the spacer-wire clip.

14. A spacer-wire clip to be secured to a solar panel, comprising:
    a flange overhang portion defining a flange cavity to receive a portion of a flange of a first solar panel;
    a main body portion to space an external surface of the flange of the first solar panel from an adjacent second solar panel in a stacked arrangement;
    a frame arm portion comprising a surface to be positioned against an outer perimeter of a frame of the first solar panel and prevent the portion of the flange from removal from the flange cavity when the frame arm portion is positioned against the outer perimeter of the frame; and
    a wire retainer extending from the main body portion to selectively retain at least one wire within at least one wire cavity,
    wherein the frame arm portion comprises a first portion extending perpendicular to the main body portion at a first end of the main body portion, the first portion positioned to be adjacent an edge of the second solar panel when the spacer-wire clip is installed on the first solar panel and the second solar panel is positioned adjacent to the first solar panel in the stacked arrangement,
    wherein the frame arm portion comprises a second portion extending perpendicular to the main body portion at the first end of the main body portion and in a direction opposite the first portion, the second portion positioned to be adjacent to the first solar panel when the spacer-wire clip is installed on the first solar panel.

* * * * *